(12) United States Patent
Martin

(10) Patent No.: US 6,712,615 B2
(45) Date of Patent: Mar. 30, 2004

(54) HIGH-PRECISION COGNITIVE PERFORMANCE TEST BATTERY SUITABLE FOR INTERNET AND NON-INTERNET USE

(76) Inventor: Rolf John Martin, 1 Barlow Farm Rd., Sherman, CT (US) 06784

( * ) Notice: Subject to any disclaimer, the term of this patent is extended or adjusted under 35 U.S.C. 154(b) by 24 days.

(21) Appl. No.: 09/861,768

(22) Filed: May 22, 2001

(65) Prior Publication Data

US 2003/0186201 A1 Oct. 2, 2003

Related U.S. Application Data

(60) Provisional application No. 60/206,072, filed on May 22, 2000.

(51) Int. Cl.[7] .............................................. G09B 19/00
(52) U.S. Cl. ...................... 434/236; 434/238; 434/323; 434/350; 434/428
(58) Field of Search ................................ 434/236, 350; 702/89, 186, 187; 713/125

(56) References Cited

U.S. PATENT DOCUMENTS

| | | | |
|---|---|---|---|
| 4,435,424 A | | 3/1984 | Wurtman |
| 4,464,121 A | | 8/1984 | Perelli |
| 4,755,140 A | | 7/1988 | Rimland |
| 4,770,636 A | | 9/1988 | Buschke |
| 4,978,303 A | * | 12/1990 | Lampbell .................. 434/258 |
| 5,059,127 A | | 10/1991 | Lewis et al. |
| 5,079,726 A | | 1/1992 | Keller |
| 5,230,629 A | | 7/1993 | Buschke |
| 5,551,879 A | * | 9/1996 | Raynie et al. ............. 434/236 |
| 5,657,256 A | | 8/1997 | Swanson et al. |
| 5,724,987 A | | 3/1998 | Gevins et al. |
| 5,827,070 A | | 10/1998 | Kershaw et al. |
| 5,911,581 A | | 6/1999 | Reynolds |
| 6,120,440 A | * | 9/2000 | Goknar ...................... 600/300 |
| 6,164,975 A | * | 12/2000 | Weingarden et al. ....... 434/322 |
| 6,280,198 B1 | * | 8/2001 | Calhoun et al. ............ 434/236 |
| 6,334,778 B1 | * | 1/2002 | Brown ........................ 434/258 |
| 6,427,063 B1 | * | 7/2002 | Cook et al. .................. 434/350 |

OTHER PUBLICATIONS

Rolf Martin, U.S. Copyright Reg. TX 4–983–518, Choice Reaction Time Measurement and Gateway to Connecticut Hills Healthspan Measurement Sites w Pet code.
Dev. Psychol. 1994 30(2): 240–259. *The Nature of the Influence of Speed on Adult Age Differences in Cognition*; T. Salthouse.
Environ Health Prospect., Apr. 1996 104 Suppl. 2:247–73 Performance tests; A. Wetherell.
Neuropsychologia; Sep. 1998: 36(9): 915–23 *Test/re-test Reliability of the CANTAB and ISPOCD Neuropsychological Batteries; Theoretical and Practical Issues;* Cambridge Neuropsychological Test Automated Battery. International Study of Post–operative Cognitive Dsyfunction; C. Lowe, et al.
Psycol. Bull. Nov. 1997; 122(3): 231–49; *Meta–analyses of Age–cognition Relations in Adulthood: Estimates of Linear Nonlinear Age Effects and Structural Models;* Verhaeghen, et al.
Arzneimittelforschung; Jun. 1997; 47(6):781– *Test–retest Reliability and Influence of Practice Effects in a multi–user Computerized Psychometric Test System for Use in Clinical Pharmacological Studies;* M. Versavel, et al.
Proc. Amer. Aging Assoc. Jun. 1–4, 2001: Madison, WI *A Test–retest Reliability of 0.99 for Measuring Gradual Cognitive Change: The Danbury MS Blueberry Study;* C. Pappas, et al.

* cited by examiner

*Primary Examiner*—Jessica Harrison
*Assistant Examiner*—John Sotomayer
(74) *Attorney, Agent, or Firm*—John A. Evans; Connolly Bove Lodge & Hutz LLP

(57) ABSTRACT

A system and method for internet-based cognitive performance measurement is provided. Furthermore, a method is provided whereby improvements in statistical accuracy is obtained.

95 Claims, 14 Drawing Sheets

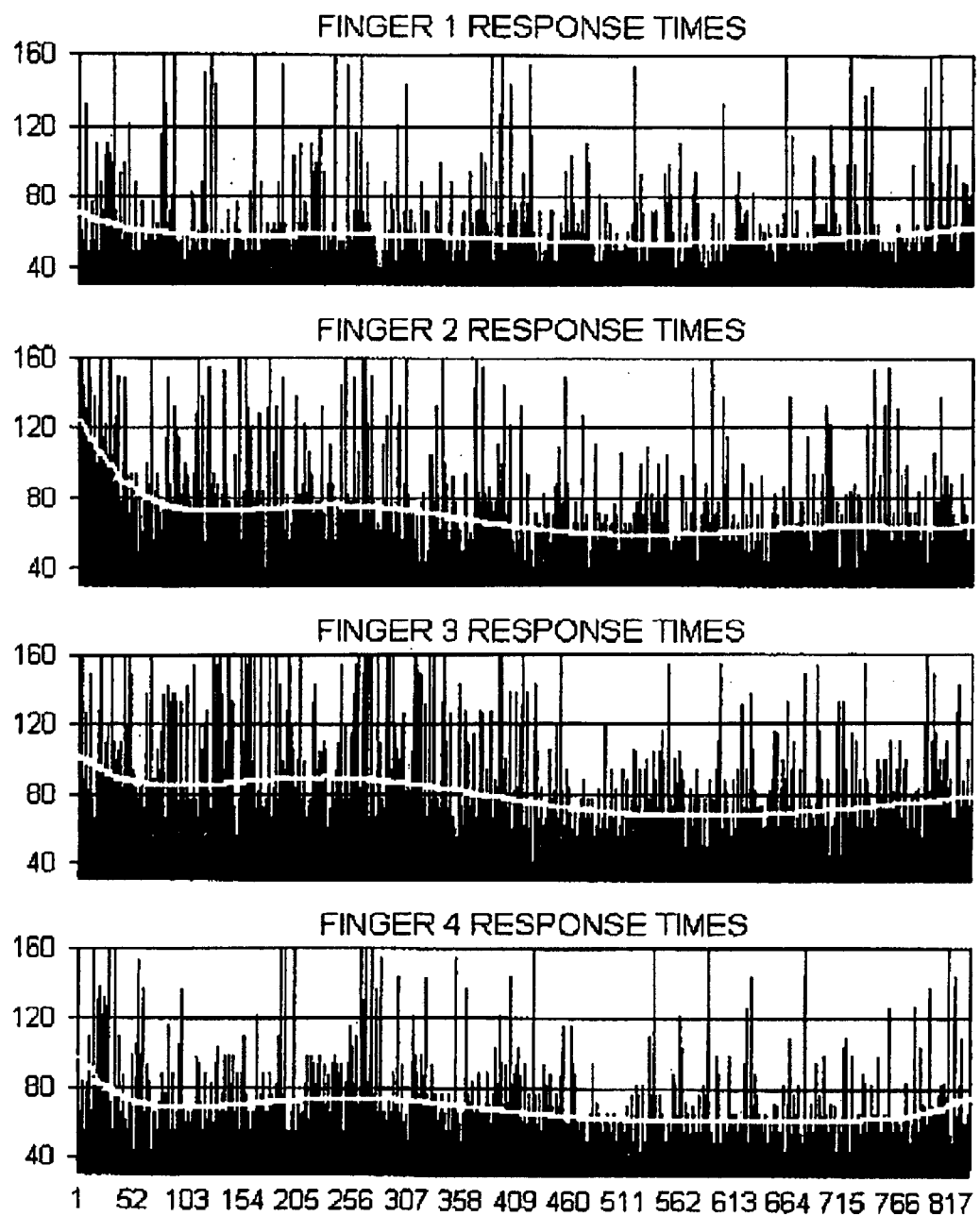

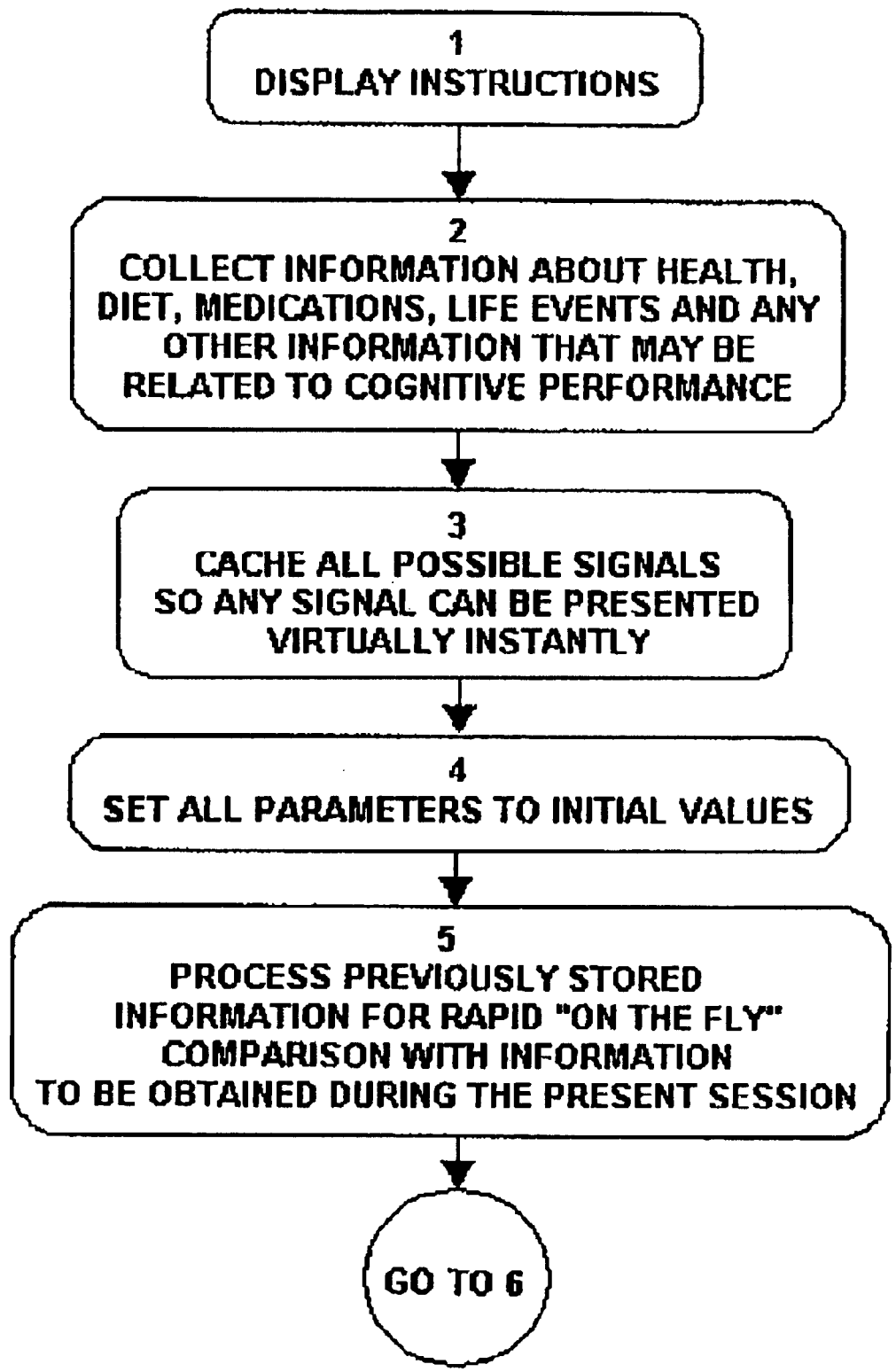

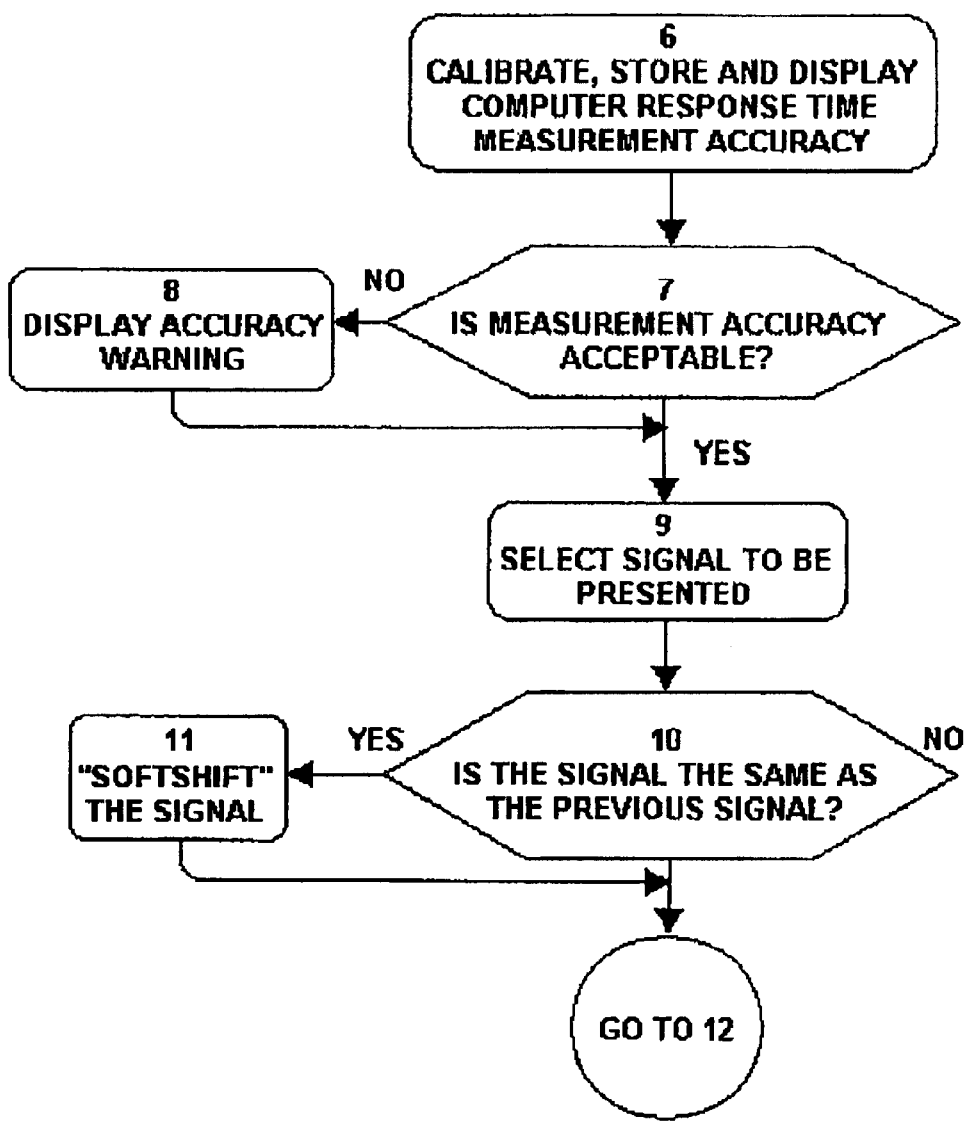

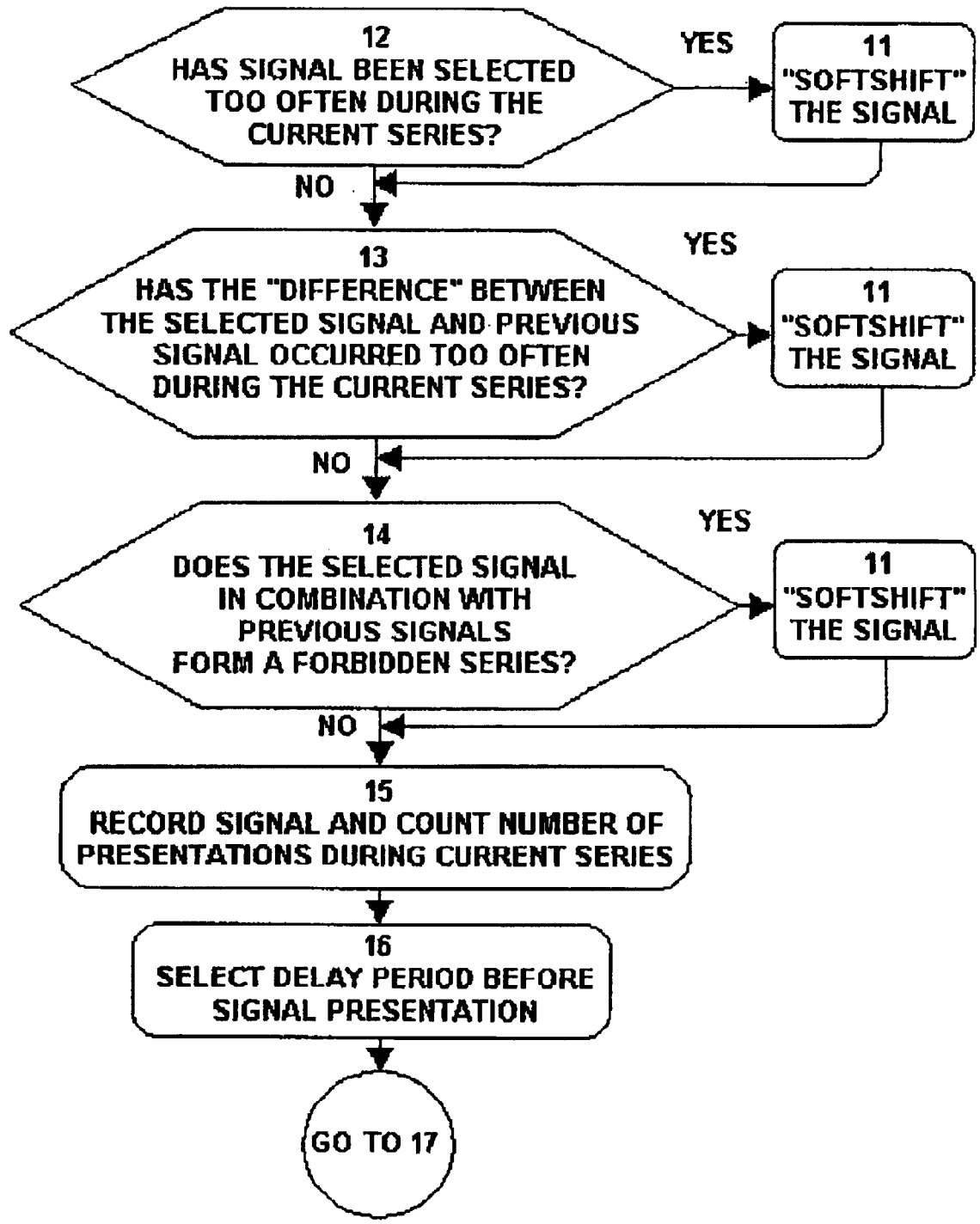

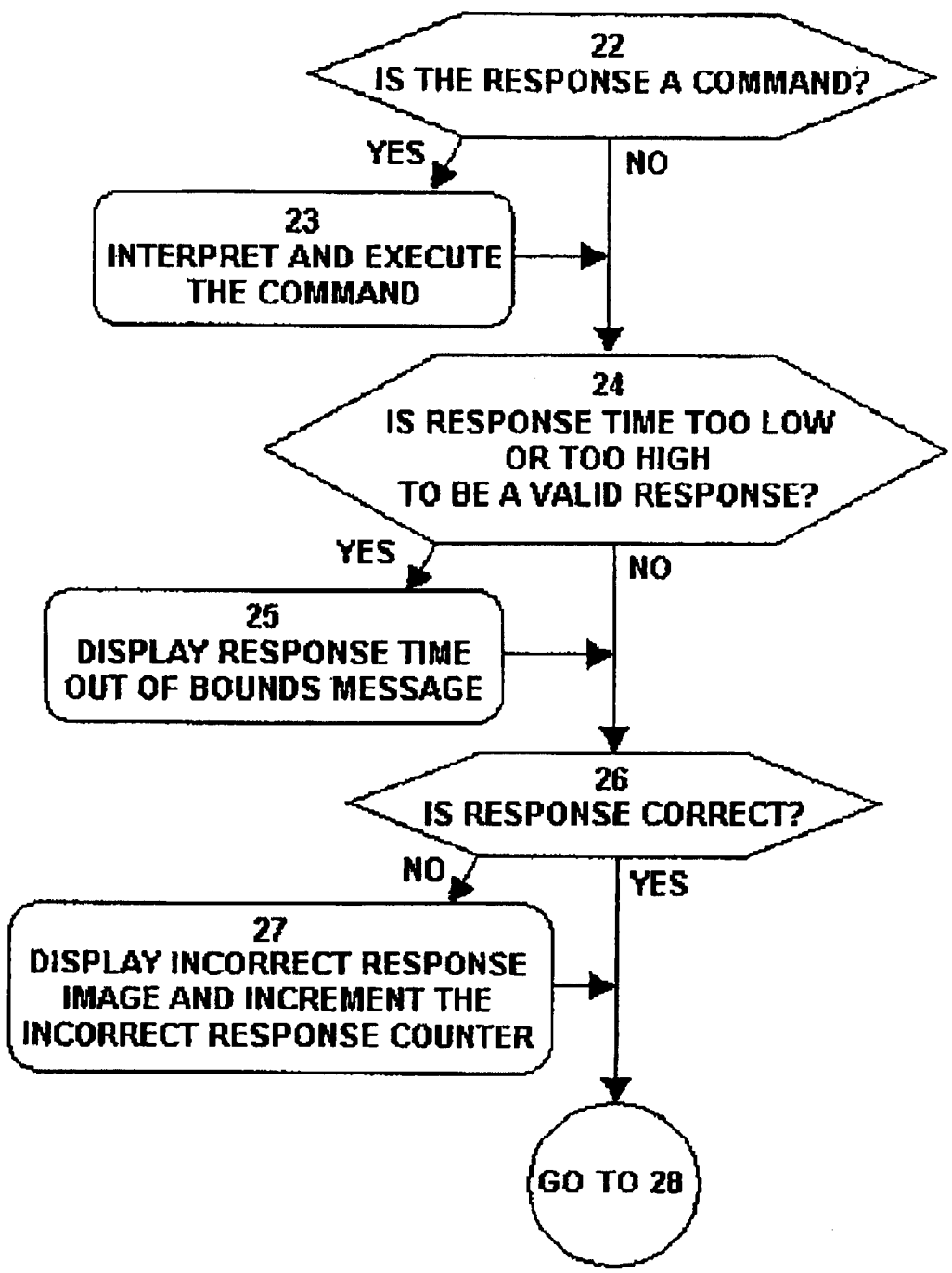

HIGH-PRECISION COGNITIVE PERFORMANCE TEST BATTERY SUITABLE FOR INTERNET AND NON-INTERNET USE

REFERENCE TO PRIORITY

The present application claims the priority of Provisional Application No. 60/206,072, filed May 22, 2000.

TECHNICAL FIELD

The present invention relates generally to a system and method for internet-based cognitive performance testing.

BACKGROUND OF THE INVENTION

Systems and methods for computer based testing (CBT) are known to the art. For example U.S. Pat. No. 5,827,070 to Kershaw et al. discloses CBT means for administration of standardized test, e.g. SATs, LSAT, GMATs, etc. The system and method of Kershaw et al. does not depend on the speed and accuracy of the individual examinee's keystroke responses to the test stimuli. Lewis et al. (U.S. Pat. No. 5,059,127) disclose a computerized mastery testing system providing for the computerized implementation of sequential testing. This disclosure also does not relate to the speed and accuracy of the individual examinee keystroke responses to the test stimuli. Swanson et al. (U.S. Pat. No. 5,657,256) disclose a method and apparatus for administration of computerized adaptive tests. Swanson is similarly unconcerned about the examinee response time.

When people measure their response time, recall or other cognitive skills using computer-based test systems, they typically press number or letter keys (or keys representing other symbols like circles and squares) in response to visual or auditory or other sensory signals presented to them. The average time they take to press the correct keys is their response time.

This type of measurement is subject to a number of errors that make response time results relatively imprecise. The effects of recent foods and beverages, medicines, amount of sleep and other factors that affect alertness or drowsiness all influence response speed and accuracy, so that measurements on any single day may not represent actual average performance level.

A key source of measurement error is change in motivation to respond quickly. One day a person may try quite hard to reduce their response speed. The next day they may relax and perform more slowly simply because they care less about their "score" that day. Typically the error rate increases (incorrect responses are made more frequently) when people try harder to react quickly. Investigators commonly measure error rate to determine the "response speed/accuracy tradeoff" for each person or group of people.

While the response speed/accuracy tradeoff is usually discussed in connection with relatively simple responses, a similar tradeoff can occur during memory measurements when speed is only a secondary consideration. Response speed is intrinsically linked with recall accuracy because transient memory traces fade if the response (e.g. typing a list of words) is not completed rapidly.

Response speed may also vary from second to second and minute to minute as a result of boredom with the test, short-term fatigue from repeated motion, eye strain from staring at the computer screen, and stimulus patterns that confuse the user and cause response errors. Different types of transitions such as shifts between responses involving one hand and the other, or one finger and the corresponding finger on the other hand, can also affect response speed and accuracy for individual responses.

All of these factors together make precise performance measurement all but impossible. Even under controlled laboratory conditions, the correlation between test scores on one occasion and scores by the same individuals at a later time, averages only 0.63 (Salthouse & Babcock, 1991; Lowe & Rabbitt, 1998; Versavel et al., 1997; Wetherell, 1996). In other words, performance results can vary by plus or minus 20% from one day or week to the next.

The correlation between test results on separate days, called "test-retest reliability," is perhaps the most widely used indicator of measurement reliability. The average value of 0.63 has not changed appreciably during the last two decades, indicating that attempts to improve measurement reliability have generally met with little success.

Perhaps the best way to describe the need for measurement precision, and the need for this invention, is to discuss the circumstances of an individual who participated in a recent study to determine whether blueberries can reduce multiple sclerosis symptoms (Pappas et al., 2001).

SF is one of hundreds of thousands of people in the U.S. who have chronic, neurodegenerative diseases for which there is no cure. He cannot drive and cannot find work because his coordination and memory are affected. He must sell the home he, his wife and children live in because they need the money for his medical and dental expenses. His relatively expensive medicines give no apparent benefit. The medicines do however dry his mouth and cause his teeth to crack, causing him to lose three teeth during the last several months. Concerned about his dental bills, SF asked his dentist to remove his remaining teeth so he would not have to pay to have them repaired when he would lose them anyway. (His dentist refused.) His physician advised him to take a recommended performance test battery just once a year because he cannot afford the cost of more frequent evaluations. He must therefore wait for very long periods of time before obtaining objective evidence that his medications are or are not helping him—time he can ill afford since his disease is growing steadily worse. And of course after such long waiting periods, any performance benefits provided by his medications may be cancelled by the steady decline from his chronic illness.

SF can expect to decline at a rate which reduces his performance scores by roughly 4% to 10% each year. If his medicines are effective, his annual decline may be decreased by half a percentage point or perhaps several percentage points—however he most probably cannot measure this benefit because once-a-year testing is not accurate enough to measure changes smaller than 5%. Once-a-year testing will always be incapable of measuring changes of 5% or less simply because he may perform 5% or 10% better or worse than his average on the day when measurement is performed.

So the test results for which SF must wait so long, and pay so much for, are largely worthless to him and his physician since they will not be precise enough to indicate whether his medicines helped him.

SF clearly needs, and many thousands of other people in similar circumstances need, a test system that is accurate to within 1% or 2% so that effective treatments can be identified. He also needs a measurement system that is far less expensive than that recommended by his physician, so that he can obtain results many times each year. And he needs a test that can be taken at home, so that he is spared the effort and/or the cost of transportation to a test center.

For these and many other reasons, there is a clear need for increased measurement precision One strategy used by scientists seeking greater precision is to reduce response time variability by discarding high and low responses within each test or test series. For example, the slowest half and the fastest quarter of response times may be discarded from each 30 seconds of testing, and the average of the remaining data obtained.

This type of data trimming certainly reduces variability—but it also reduces the amount of useable data and therefore reduces measurement precision, which is related to the amount of data. (As a general rule, precision is directly proportional to the square root of the number of data points, if approximately random variation is the cause of imprecision.)

Discarding high response times also prevents or sharply reduces the accuracy with which benefits or harm from different health strategies can be measured if performance changes occur primarily within the response times that are discarded. This occurred recently during an Danbury MS Blueberry Study (Pappas et al, 2001). Very slow response times were markedly reduced after blueberry consumption for many study participants, however this was not evident from trimmed data sets, from which all slow responses had been removed. Only when raw data was examined did the principal investigator see this benefit.

Scientists have also attempted to reduce measurement error by reducing practice effects that occur when examinees take the same or similar tests repeatedly. Gradual improvement due to practice is different for each individual and even for each type of response for each individual. Such gradual improvement can mask benefits of medication or other health strategies, or can mask harm due to exposure to pollutants, fatigue, etc.

To reduce practice effects, investigators have asked examinees to take tests many dozens of times, so that the learning period can be passed and further improvement due to practice will not occur. This practice-until-no-more-improvement-occurs strategy was not generally successful since improvement typically occurs over hundreds or even thousands of responses. This strategy is of course impractical for people like SF when the expense and effort of travel and testing are high. There is a clear need for test methods that reduce or eliminate practice effects.

Measurement precision and test-retest reliability has for the most part been ignored by inventors interested in reaction time and memory measurement. Only two previously patented performance measurement methods related to "reaction time" have explicitly addressed the issue of test-retest reliability and measurement precision. None have evidently attempted to determine the precision with which response time measurements are made.

Wurtman (1984) obtained a test-retest reliability of 0.65–0.74 when evaluating an amino acid mixture for improving vigor and mood in normal human patients, however the method used to obtain this test-retest reliability was not the subject of his patent.

Using an electroencephalogram-based, computer-aided training method and 4 examinees, Gevins et al (1998) obtained an average "test set classification" of 95% (range 92%–99%) calculated by a trained pattern-recognition network. Their "test-retest reliability" computation algorithm apparently had little to do with the (Pearson) correlation coefficient commonly used to determine test-retest reliability values. Their use of the phrase "test-retest reliability" illustrates the difficulty that can arise when a term used to define measurement precision is given different meanings by different investigators.

Rimland (1988; U.S. Pat. No. 4,755,140) describes a hand-held reaction time test but does not determine either test-retest reliability or the precision with which reaction time is measured. His device that employs no signal sequence restrictions and other apparent methods for improving precision.

Reynolds et al. (1999; U.S. Pat. No. 5,991,581) developed an interactive computer program for measuring mental ability that automatically adjusts task complexity and selects letters or symbols with equal probability. No discussion of performance measurement precision or test-retest reliability is provided, and there is no determination of the precision with which response time measurements are made.

Buschke (1988; U.S. Pat. No. 4,770,636) describes a memory monitor that produces challenge signals 7 or 10 digits in length. He mentions no signal sequence restrictions that might improve measurement precision. His choice of 7 or 10 digit sequences quite likely results in frustration for individuals who cannot handle such long numbers and reduced precision for individuals who can handle 10 digits readily. His use of punctuation after three-digit segments within these longer sequences appears to be a step in the right direction since it will promote consistent "chunking" of signals within and between data sets.

Buschke's 1993 "cognitive speedometer" (1993; U.S. Pat. No. 5,230,629) involves relatively sophisticated control measurements but also does not determine measurement precision or employ signal-sequence restrictions. He does attempt to control the speed-accuracy ratio by keeping errors below an upper limit but does not ask examinee's to proceed quickly enough to make at least a minimum number of errors. This allows considerable response speed variability since examinee's may relax or proceed with greater vigor from time to time, without ever exceeding or even approaching his permitted level of errors.

Perelli (1984; U.S. Pat. No. 4,464,121) has developed a portable device for measuring fatigue effects that he did not determine test-retest reliability or measurement precision. He does however increase precision by blocking challenge signal repetition. No two signals in a row can be identical. His motivation for this restriction was not to improve measurement precision but to clearly indicate each new trial. Nevertheless his restriction is important since it removes trials where the signal is the same as that just presented, and therefore prevents examinees from responding more quickly to such signals than to others and therefore reduces variability among response times and increases measurement precision. He also does not encourage examinees to proceed quickly enough to make a minimum acceptable number of errors and therefore allows more response speed variability than optimal.

Keller's response speed and accuracy measurement device (1992; U.S. Pat. No. 5,079,726) also does not allow the same digit twice in a row within each 5 digit signal, and several other restrictions are also imposed. 5-digit signals cannot begin with the number 1. Adjacent sequential digits are forbidden. And no digit may be used twice within the same 5-digit signal. He does not however place any restrictions on the frequency of digits or transitions between digits over a series of signals. Thus he permits one digit, say the number 2, to appear a disproportionate amount of the time during a series of measurements. If an examinee is especially fast or slow when pressing 2, his or her average response times will be reduced or elevated in comparison to other measurement sessions, response time variability will be increased and measurement precision will be decreased. He makes not effort to limit error rates to maximum or minimum levels and does not determine the precision with which response times are measured.

There exists a need to eliminate computer delay as a source of error.

Virtually all computers have hidden "background" processes that occur from time to time and compete with resources required for accurate time measurement. The problem is particularly severe in the most powerful, modern computers, which have large numbers of background processes. Every several minutes, one or another task is undertaken that delays response time measurement by approximately 5% or more—enough to increase measurement variability beyond the accuracy needed for precise assessment of medical benefits or performance effects from other potentially dangerous or life-saving activities, events or conditions. If several competing programs are active when measurement is made, as much as 100% of the computers central processing unit ("CPU") time may be occupied, possibly for as long as or longer than several seconds.

FIG. 1 shows a screen shot of CPU usage in the absence of user-initiated activity obtained from a 200 MHz Windows NT 4 Gateway computer. Periodic, transient demands on CPU capacity are evident, including one relatively unusual spike up to 100% of CPU capacity that lasted several seconds before receding.

During the recent Danbury MS Blueberry Study (Pappas et al., 2001), when interference from background activities was measured before each keystroke during choice reaction time testing, occasional interference was recorded for all study participants, and most had potentially significant interference clusters from time to time (FIG. 2).

Performance results obtained during this past year during the Danbury MS Blueberry Study indicate that measurement error was limited to 1% or 2% (test-retest reliability was 0.991) and that practice effects were negligible when testing (and therefore practice) was limited to 2 minutes each week (FIGS. 3 and 4). Analysis of response times obtained after interference was detected indicates that apparent response times increased by roughly 7%, depending on the severity of the interference. This 7% error is large enough to a serious concern, but not so large that it cannot be reduced to insignificance by frequent (twice per second) precision checks and rejection of questionable data.

The precision improvement methods described in this patent application and employed during the Danbury MS Blueberry Study controlled measurement variability to a greater extent than expected and allowed data sets for individual participants to be split into separate performance measures for each finger used during response time testing. FIG. 4 contains a typical single-finger data set for one of the study participants. The steady, parallel changes observed for each finger indicate that measurement precision was quite sufficient for this type of single-finger monitoring.

A thorough search of prior art has indicated that average measurement precision among 77 different published performance tests was surprisingly low. Test-retest reliability was only 0.63. Results obtained this past year using the methods described herein yielded a test-retest reliability of 0.991. Accordingly, there exists a need for a method for increased measurement precision.

SUMMARY OF INVENTION

The present invention provides a computer based system for testing the cognitive performance of at least one examinee comprising: comprising: at least one source network entity (SNE) having machine readable instructions, at least one test development system, local memory, and a plurality of executable files stored in said memory; a data distribution system (DDS) logically connected to said source network entity; and at least one destination network entity (DNE), having local memory, logically connected to said data distribution system.

The present invention provides a system for internet-based testing comprising a plurality of subsystem including: a test development system; a data distribution system; a workstation; a workstation calibration system; an examinee monitoring system; and an examinee motivation system.

According to an aspect of the present invention, a test development system is provided. The test development system comprises a digital computer provided appropriate software such as an operating system and means for generating digital representations of challenge signals to be presented to an examinee. Signals may be numbers, letters, words, other symbols, sounds or combinations of these and/or other response triggers. The signals may be presented singly or in any combination of the plurality of possible signals. The test development system further comprises appropriate software, databases and digital storage means. The test development system provides a definition file defining specific information said test development system requires and a format in which said specific information is to be provided, at least one examinee information file, at least one examinee response file.

According to an aspect of the invention, the test development system is logically connected, in computer fashion to data transmission means. Such a connection may be for example a modem or cable modem connection to the internet. In such case the data transmission means comprise the internet.

According to an aspect of the present invention, a data distribution system is provided. The data distribution system According to an aspect of the present invention a computer based method for testing the cognitive performance of at least one examinee is provided. The method comprises the steps of:

(a) providing a computer based testing system comprising: at least one source network entity (SNE) having machine readable instructions, at least one test development system, local memory, and a plurality of executable files stored in said memory; at least one data distribution system (DDS) logically connected to said source network entity; at least one destination network entity (DNE) logically connected to said data distribution system, wherein said DNE has local memory;

(b) generating a computer signal train comprising said at least one set of instructions, said at least one test development system and said plurality of executable files and transmitting said computer signal train to said data distribution system;

(c) embodying said computer signal train in a carrier wave using said data distribution system;

(d) distributing said carrier wave embodying said computer signal train to said destination network entity;

(e) displaying general and motivational instructions to said examinee;

(f) obtaining information relating to examinee health history and cacheing said information in DNE memory;

(g) calibrating said destination network entity, wherein said calibration is performed iteratively prior to each response;

(h) displaying at least one softshifted challenge signal;
(i) measuring at least a first cognitive performance of said examinee, wherein said measurement is bounded by pre-determined error limits;
(j) providing performance feedback to said examinee;
(k) providing motivational feedback to said examinee; and
(l) providing summary information to said examinee.

According to an aspect of the invention, a computer-based performance measurement system is provided that provides more precise results than previously available, for at least some measures of performance.

According to an aspect of the invention means are provided for obtaining more precise performance data than previously possible, so people, and/or their physicians, can determine how to improve their health, so that scientists can conduct more precise performance research, and so that other people interested in their performance can obtain more reliable, more convenient and more affordable performance measurements.

An aspect of this invention is the linked storage of information about 1) performance, 2) computer measurement accuracy, 3) health and 4) health-related activities and events, including foods, beverages and medications consumed, exercise, sleep, social events and any activity or event that may possibly affect health or performance. Storage may be in one or more data files but must be accomplished to enable information in each of these four categories to be linked together so that logical conclusions can be reached. A key aspect of the information stored in each category is the date and time of each measurement, aspect of health, activity or event.

Time stamps allow performance results to be rejected or corrected if measurement precision calibration results obtained immediately before or afterward raise doubts about measurement accuracy at that time. Computer measurement error typically occurs when other background processes ("interference") prevent timely execution of the measurement software commands. Such interference usually occurs for relatively short periods of time, so performance data can be rejected if it was obtained at approximately the same time interference was detected. Rejecting just some data while keeping results obtained when calibration results are satisfactory allows more data to be used and therefore increases measurement precision, even for computers subject to relatively high levels of transient background interference.

Time stamps also allow performance, health and health activity information to be related.

According to an aspect of the invention, changes in examinee response time and short-term memory are measured. Changes in examinee response time and short-term memory may have important medical-diagnostic value, indicating for example local areas of hypoxia (low oxygen) or other transient or progressive health problems, and may provide a relatively precise measure of the effectiveness of different doses and combinations of medications and health supplements for the individual examinee.

A further aspect of the invention provides measures of cognitive performance having precision sufficient to measure changes in the performance of individual examinees, rather than just changes among groups of examinees.

According to an aspect of the invention, means are provided for relating ingestion of dietary components or supplements, medications or other drugs, or alcohol to changes in cognitive performance.

According to an aspect of the invention, means are provided for increasing the number of performance measurements obtained per unit time per examinee and means are provided for increasing the precision of those measurements. Therefore, also is provided means to decrease proportionately the cost of long-term experiments and to enable research protocols that otherwise would be too expensive to be funded.

According to an aspect of the invention, a response time measurement system is provided that instructs users to remain above a minimum error rate and/or specifies a relatively narrow range of recommended error rates.

According to an aspect of the present invention, methods for reducing measurement error are applied to virtually any computer-based performance measurement system, whether the challenge signals comprise numbers, letters, words, other symbols, sounds or combinations of these and/or other response triggers or whether single responses or a series of different responses are required.

According to an aspect of the present invention, methods are provided applicable to a variety of response time measurements (such as simple and choice response time, digit-symbol substitution tests and memory scanning tests) and also to memory measurements (such as number recall, word recall and word pair recall).

According to an aspect of the present invention, use of the Internet for repeated and more precise performance measurement may provide scientists with both an opportunity and a previously missing spark for development of global standards for performance tests that will speed many different areas of health research.

Still other objects and advantages of the present invention will become readily apparent by those skilled in the art from the following detailed description, wherein it is shown and described preferred embodiments of the invention, simply by way of illustration of the best mode contemplated of carrying out the invention. As will be realized the invention is capable of other and different embodiments, and its several details are capable of modifications in various obvious respects, without departing from the invention. Accordingly, the description is to be regarded as illustrative in nature and not as restrictive.

BRIEF DESCRIPTION OF DRAWINGS

FIG. 5 is a flow chart outlining instructions presented to examinee prior testing, FIG. 6 is a flow chart outlining signal generation, computer calibration, and feedback.

DETAILED DESCRIPTION OF A PREFERRED EMBODIMENT

Figure 1:
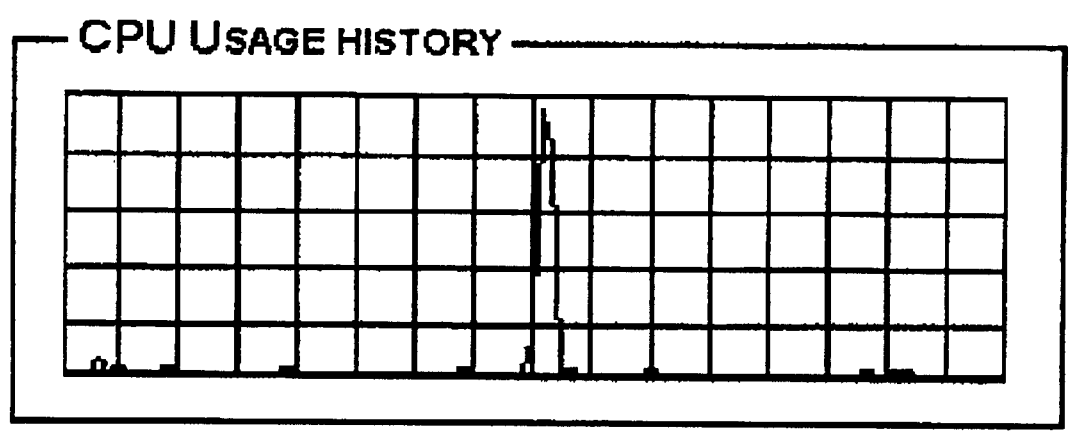
FIG. 1 is screen shot showing central processing unit usage for a Windows NT 4.0 200 MHz Gateway 2000 computer in the absence of user-initiated activity occurred.
Figure 2:
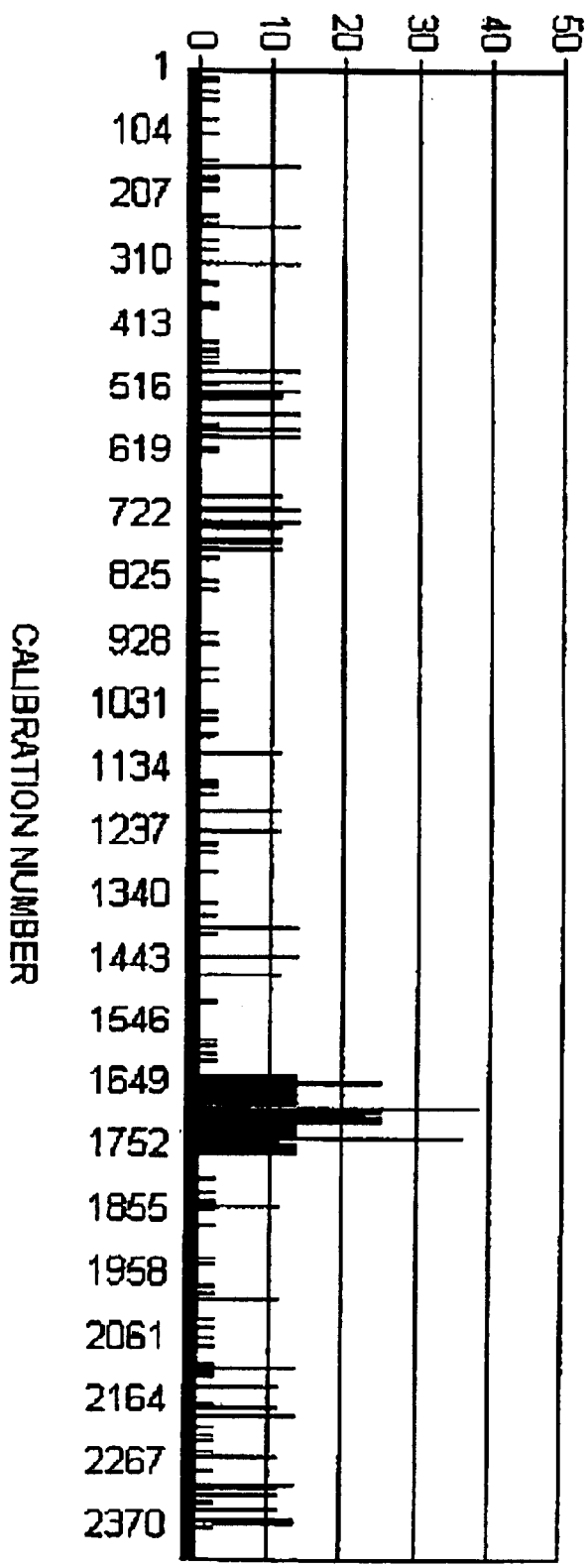
FIG. 2 is a graph of percent measurement error for one of the participants during the Danbury MS Blueberry Study.

Reference is made to the figures to illustrate selected embodiments and preferred modes of carrying out the invention. It is to be understood that the invention is not hereby limited to those aspects depicted in the figures.

The unique methods that make the performance measurement system described in this application effective are a combination of measurement error reduction methods and variability monitoring systems designed to reduce sources of variation in response speed and response accuracy that operate from one fraction of a second to the next, one second to the next, one minute to the next, one day to the next, and even one week, month and year to the next.

The intent is not only to reduce measurement variation that occurs in subsecond to monthly and yearly cycles but to monitor the variation at each time scale and make immediate announcements to the user, within each measurement session, to ensure that all sources of variability and measurement error are within acceptable boundaries or at least that all possible adjustments are made to minimize sources of measurement variation the moment they are detected.

To reduce measurement error due changes in alertness or drowsiness or changes in motivation to respond rapidly (e.g. to match or beat previous scores) for any reason, measurements are obtained with repeated feedback concerning past and present response times and error rates, so that people taking measurements can see even within each series of responses whether they are performing as quickly and as accurately as they were before. They can quickly adjust to match previous response speeds and error rates even before a significant portion of the present test series has passed, so that much more reliable results (at consistent error rates) are obtained.

If users cannot reduce response times to match those obtained previously because they are in fact slower during the present measurement session, they invariably try harder and their error rate increases, so that different points on the speed/accuracy tradeoff curve are explored within each measurement session. Trying different speeds and error rates, back and forth until previous error rates are matched, with explicit instructions that error rates should never be less than a minimum or greater than a maximum, essentially ensures that at least some data are obtained during past and present measurement sessions with the same or very similar degrees of accuracy. Much more precise comparison of past and present results is consequently possible. Concentration, alertness, determination to succeed typically rise sharply when users realize they are not performing up to par—so decrements due to reduced alertness are overcome and differences from previous sessions are reduced.

To reduce measurement error due to factors that vary from day to day, week to week and month to month, results from previous measurement sessions are displayed as a graph or bar chart several times during each measurement session so that response speed and error rate can be adjusted to approximate response times achieved weeks or months earlier. Display of previous results several times during each session allows corrective adjustment to occur repeatedly before the measurement session is completed.

To reduce measurement error due to eye strain, fatigue and boredom within each measurement session, each session is interrupted several times and data from the present and previous measurement sessions are graphed, percentage changes, standard deviations and error rates are displayed, and statistical significance of changes is calculated. Several types of warnings are also displayed if response time has slowed significantly in comparison with previous results. Delays while data are displayed after each 10 to 15 seconds of testing serve as important rest periods, for hands, fingers, eyes and those parts of the brain that may become fatigued after repeated use.

To reduce measurement error due to second by second and minute by minute changes other than fatigue, measurements are obtained over several minutes during each test session and pooled to obtain a more representative score for each test session.

To reduce response time measurement error due to short-term changes in speed and accuracy from confusing patterns of signals and other factors that change every several seconds, signal images are presented so rapidly and responses are triggered and measured so rapidly (two or more times per second) that changes in response speed and error rate are detected within seconds, testing is interrupted and corrective instructions can be displayed. Corrective messages allow individuals to change their speed and/or error rate so that they remain within lower and upper acceptable limits.

To reduce error due to repeated signals or to exceptionally common or memorable ("salient") signal patterns, the probability that the same signal or salient signal patterns will be chosen more than once in a row is reduced but not entirely eliminated. This probability reduction decreases response time variation due to signal repetition and salient signal patterns, but does not allow the user to rule out the possibility of repetition and anticipate and execute unusually rapid responses based upon anticipation.

Two examples will clarify the importance of reducing the occurrence of repeated signals and salient signal patterns:

Example 1: Two series of signals, chosen randomly, are presented during consecutive "choice response time" measurement sessions: 1, 1, 2, 2, 3, 3 and 4, 2, 1, 4, 3, 2. The correct response is to press the same key (1, 2, 3 or 4) as the signal. The first series almost invariably yields significantly lower response times because the same finger is used repeatedly and is primed for more rapid responses after the first use.

Example 2: During a number recall experiment, two series are presented: 1, 2, 3, 4, 4, 4 and 8, 2, 5, 1, 6, 9. The first is much easier to recall because of the obvious pattern, enabling users who normally cannot recall 6-digit series to score higher than their usual maximum of 5 digits. Each of these examples may seem far-fetched but in practice salient patterns appear quite frequently even when signals (numbers) are selected randomly, and they can cause quite noticeable performance shifts if relatively few responses are performed. Most performance investigators present so many trials—in some cases testing subjects for hours—that the effect of occasional salient signal patterns is negligible. However the goal of the invention described here is to obtain precise results within very brief periods of measurement. So it is quite important to control variation due to salient signal patterns. Brief measurement sessions are critical if users are to return frequently for measurements at different points in their personal performance cycles—so that day-by-day changes in performance do not cause errors when monthly or yearly cycles are being monitored.

Simultaneously preventing measurement error due to repeated signals or signal patterns like 1, 2, 3 . . . that lead to anticipation of one response—and avoiding changes in anticipation when users realize subsequent signals cannot occur, reduces two kinds of measurement error: response times are typically lower than average if the anticipated signal in fact occurs, and response times are typically longer if the anticipated signal does not occur.

Reducing the occurrence of unusually rapid responses, and also slower than average responses has the effect of reducing the standard deviation of a series of responses and making response time measurement significantly more precise. Reducing response time standard deviation (or any other measure of response time variation) enables small average differences in response time from one session to the next, or one day or week or month to the next, to be measured with much greater statistical confidence after shorter periods of measurement.

Evaluating the accuracy of measurements made by each computer:

To reduce measurement error due to day-by-day and second-by-second changes in computer performance and the accuracy with which each individual computer measures response time, computer measurement error is determined after each response is made, throughout each test session, and testing is interrupted if measurement error ever exceeds an acceptable upper limit. Instructions advise the user to close other programs that may slow computer command execution, or to phone a webmaster or other test supervisor for further advice concerning computer performance.

Gathering More Data:

To enable more data to be gathered during each brief measurement session, carefully chosen scoring rules have been developed. For example, the score for the day during a number recall session is defined in advance as the longest length number series that is recalled correctly three times in a row. To achieve a score of 9 for example, the user must correctly recall three different 9-digit numbers without making any errors in between. As people try to recall longer numbers and reach their limit for the day, errors become more frequent until it is not possible for them to recall three in a row. The only way to find out if they can recall three in a row is for users to try repeatedly, generating more data with each attempt, until they are convinced they cannot recall that length number three times in sequence and end the measurement session. Actual scoring by research scientists analyzing the data may involve computing the percentage correct at each users upper limit, however stating a simple, clear goal of three in a row, is easier for users to understand and aim for. For some people who are relatively impatient or older and more subject to fatigue, a score based on two-in-a-row may be best.

Computer Accuracy:

Computer measurement accuracy must by consistent from each measurement session to the next if results are to be precisely compared across sessions. To ensure that each computer is functioning properly throughout each measurement session, a standard set of computer commands are executed and timed after every keystroke, the performance-time measurements are stored and averaged, and the average for each series of accuracy measurements is displayed, so that even transient interference from other computer activities can be seen immediately. Testing is interrupted and automatic warnings appear if accuracy is not sufficient even for a single accuracy measurement, so that interference can be removed or the data set discarded. The warnings advise the user to close other programs that may slow computer command execution, or to phone a webmaster or other test supervisor for further advice concerning computer performance.

Simplest Versions:

For people with disabilities that prevent them from seeing or pressing individual keys, a version of the response time program was prepared that allows any key to be pressed when a large X is presented. To prevent users from anticipating the signal, there is a variable response time prior to signal presentation for this version of the response time test.

For people with no computer experience, a version has been prepared that requires only that the computer be turned on. The program is launched automatically and begins presenting signals without requiring any start-up keys to be pressed. The session ends when the computer is turned off.

To the best of my knowledge, no other computer program starts without even requiring "Begin" or "Start" to be pressed.

Description of Data Records

A unique aspect of this invention is the linked storage of information about 1) performance, 2) computer measurement accuracy, 3) health and 4) health-related activities and events, including foods, beverages and medications consumed, exercise, sleep, social events and any activity or event that may possibly affect health or performance. Storage may be in one or more data files but must be accomplished so that information in each of these four categories is linked together so that logical conclusions can be reached. A key aspect of the information stored in each category is the date and time of each measurement, aspect of health, activity or event recorded by the examinee before each performance measurement session.

Time stamps allow performance results to be rejected or corrected if measurement precision calibration results obtained immediately before or afterward raise doubts about measurement accuracy at that time. Computer measurement error typically occurs when other background processes ("interference") prevent timely execution of the measurement software commands. Such interference usually occurs for relatively short periods of time, so performance data can be rejected if it was obtained at approximately the same time interference was detected. Rejecting just some data while keeping results obtained when calibration results are satisfactory allows more data to be used and therefore increases measurement precision, even for computers subject to relatively high levels of transient background interference.

Time stamps also allow performance, health and health activity information to be analyzed so that the most and least beneficial activities can be identified.

According to an aspect of the invention, changes in examinee response time and short-term memory are measured. Changes in examinee response time and short-term memory may have important medical-diagnostic value, indicating for example local areas of hypoxia (low oxygen) or other transient or progressive health problems, and may provide a relatively precise measure of the effectiveness of different doses and combinations of medications and health supplements for the individual examinee.

A further aspect of the invention provides measures of cognitive performance having precision sufficient to measure changes in the performance of individual examinees, rather than just changes among groups of examinees.

According to an aspect of the invention, means are provided for relating ingestion of dietary components or supplements, medications or other drugs, or alcohol to changes in cognitive performance.

According to an aspect of the invention, means are provided for increasing the number of performance measurements obtained per unit time per examinee and means are provided for increasing the precision of those measurements. Therefore, also is provided means to decrease proportionately the cost of long-term experiments and to enable research protocols that otherwise would be too expensive to be funded.

According to an aspect of the invention, a response time measurement system is provided that instructs users to remain above a minimum error rate and/or specifies a relatively narrow range of recommended error rates.

According to an aspect of the present invention, methods for reducing measurement error are applied to virtually any computer-based performance measurement system, whether the challenge signals comprise numbers, letters, words, other symbols, sounds or combinations of these and/or other response triggers or whether single responses or a series of different responses are required.

According to an aspect of the present invention, methods are provided applicable to a variety of response time measurements (such as simple and choice response time, digit-symbol substitution tests and memory scanning tests) and also to memory measurements (such as number recall, word recall and word pair recall).

According to an aspect of the present invention, use of the Internet for repeated and more precise performance measurement may provide scientists with both an opportunity and a previously missing spark for development of global standards for performance tests that will speed many different areas of health research.

A minimal embodiment of the invention comprises a source network entity (SNE), a destination network entity (DNE), and a data distribution system (DDS) logically connecting the network entities. The network entities may be, as a non-limiting example, PC computers. In a simple embodiment, the SNE and the DNE may be the same physical device. In such example, the data distribution system comprises the internal data bus.

In a second, non-limiting example, the SNE is a network server and the DNE is a PC or workstation computer. In such example, the DDS is the internet. The DDS may be embodied as a local area network (LAN), or as an extranet.

The DDS in principle is any medium capable of distributing computer readable information. Thus the DDS may comprise an appropriately formatted diskette.

Either or both network entities may be embodied as any computational device such as, for non-limiting example, a Palm Pilot.

Figure 3:
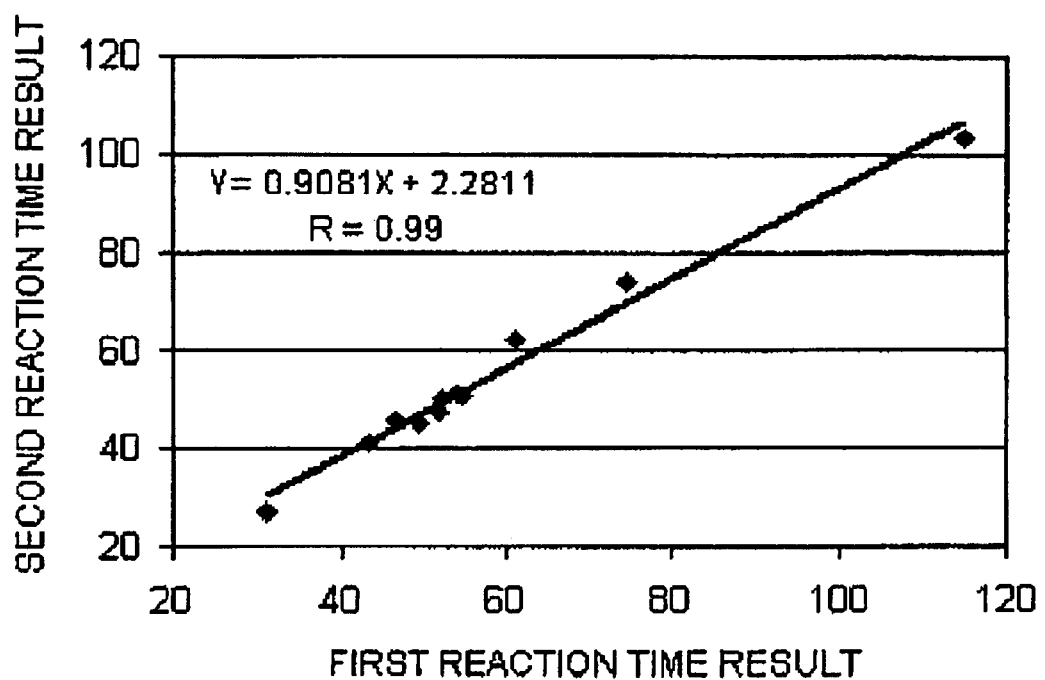
FIG. 3 shows the test-retest reliability of choice reaction time measurements during the Danbury MS Blueberry Study, FIG. 4 contains choice reaction time results for one of the Blueberry Study participants.
Figure 7A:
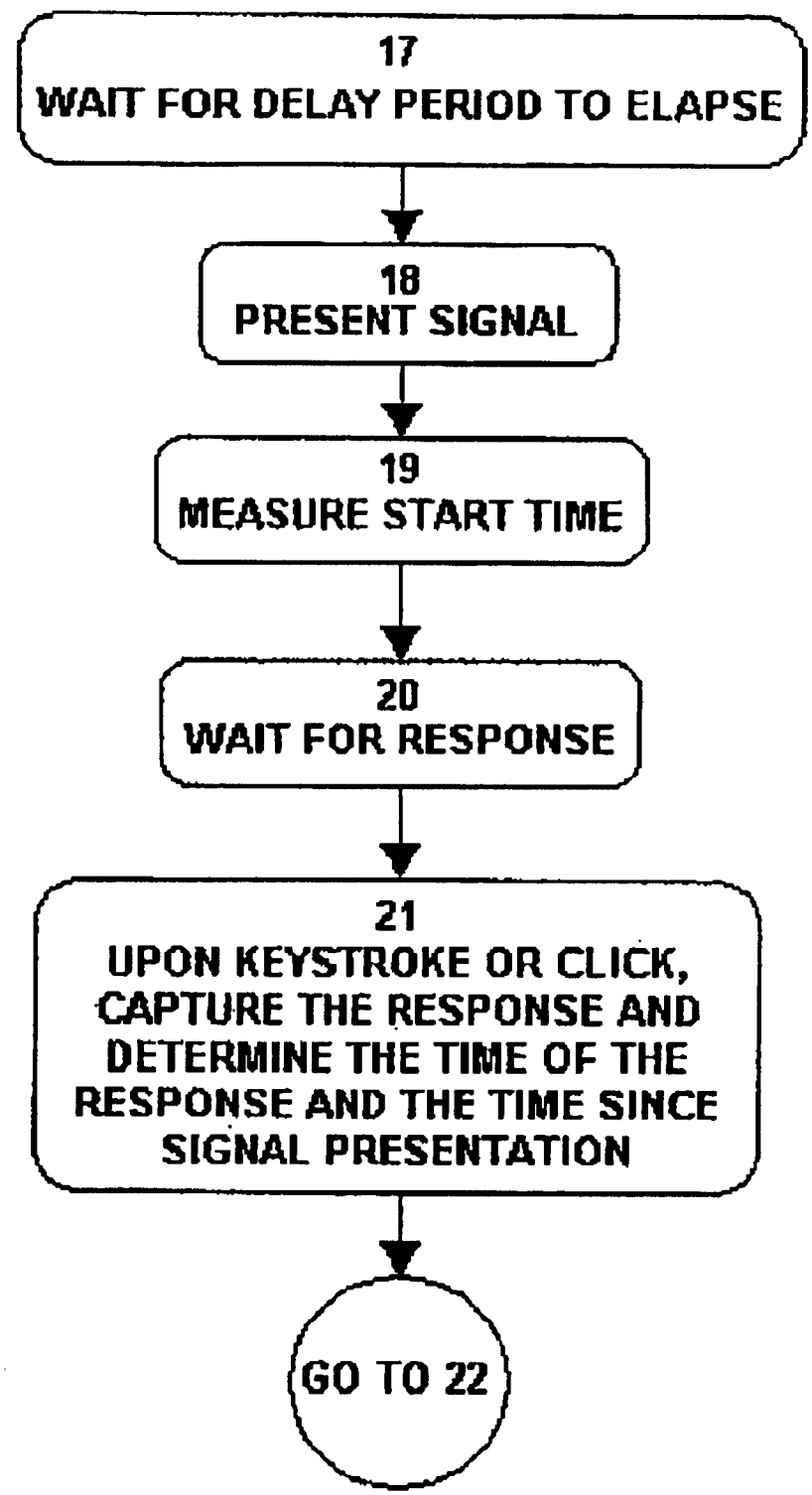
FIG. 7 is a flow chart outlining keystroke capture, processing, and feedback.
Figure 7C:
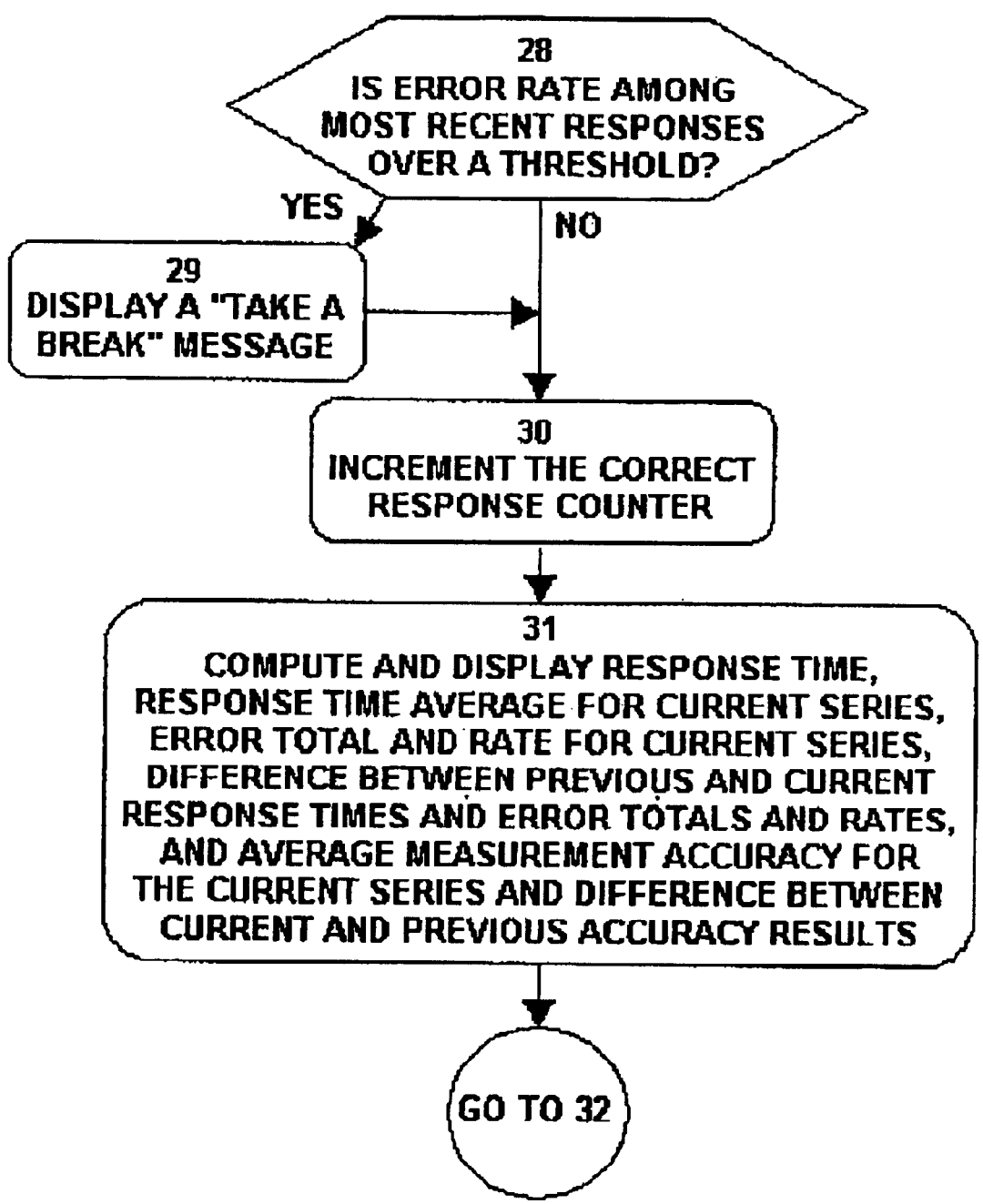
Figure 7D:
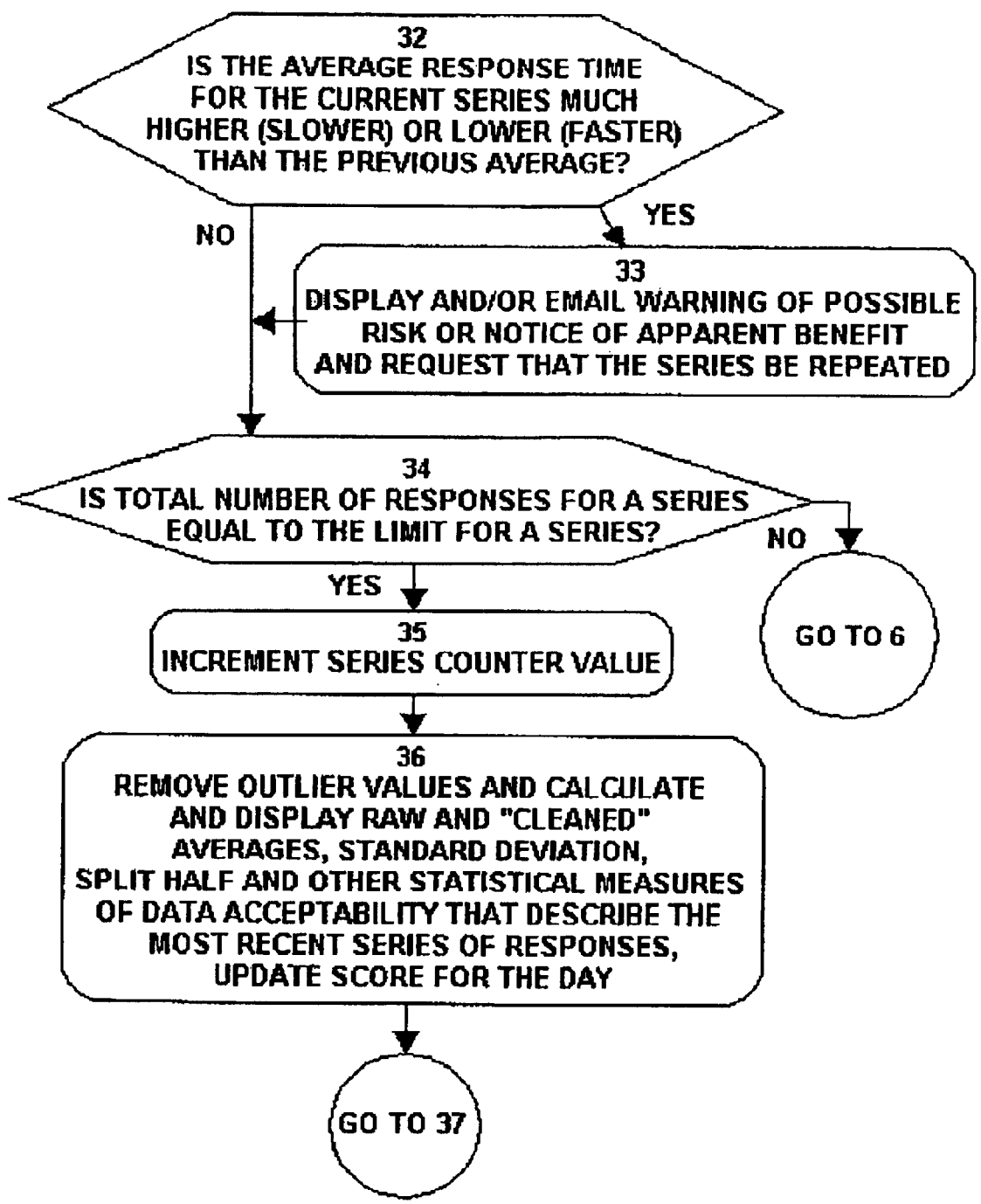
Figure 8A:
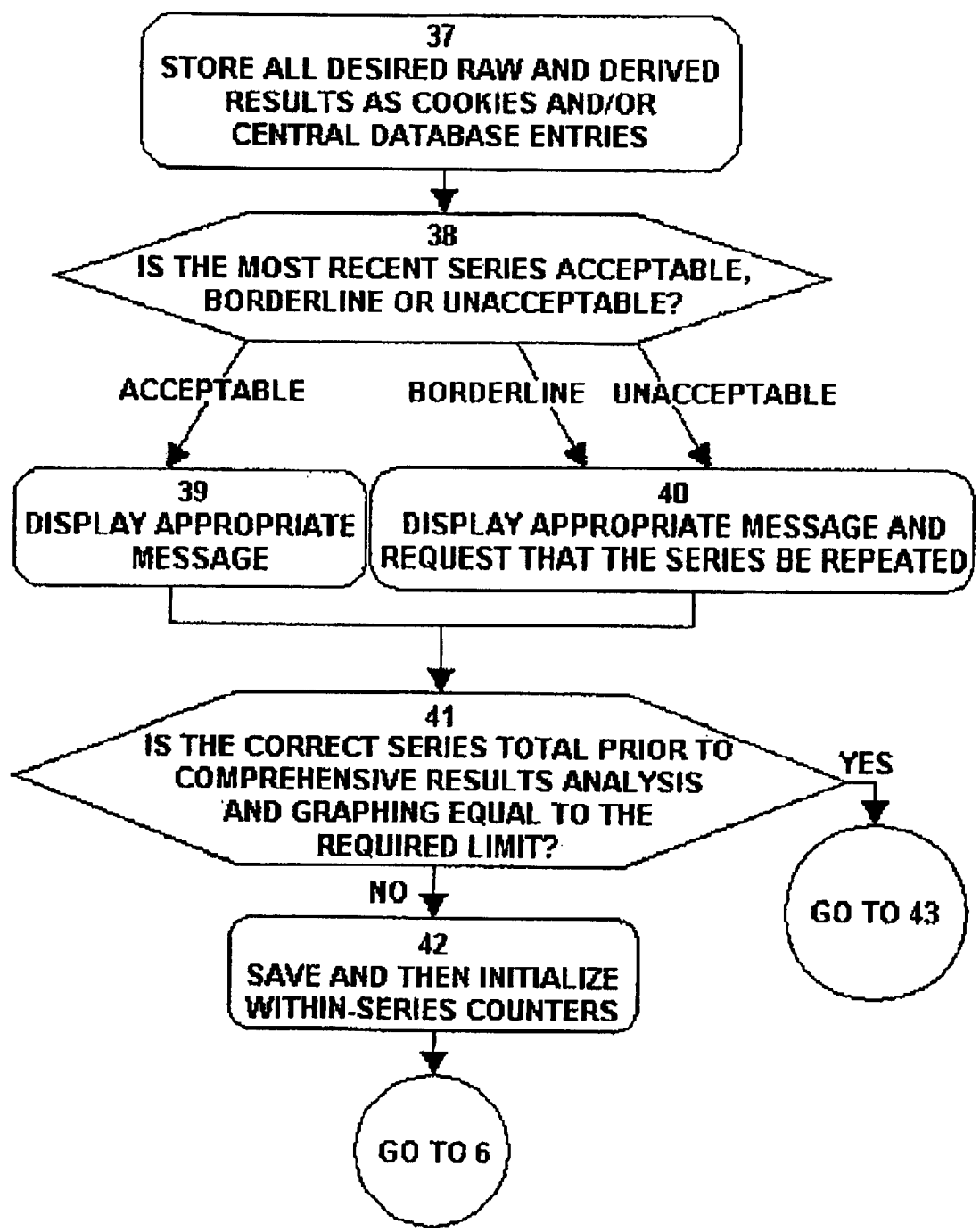
FIG. 8 is a flow chart outlining data storage, processing, and feedback, The invention is best understood from the following detailed description when read in connection with the accompanying drawing. It is to be noted, however, that the appended drawings illustrate only typical embodiments of this invention and are therefore not to be considered limiting
Figure 8B:
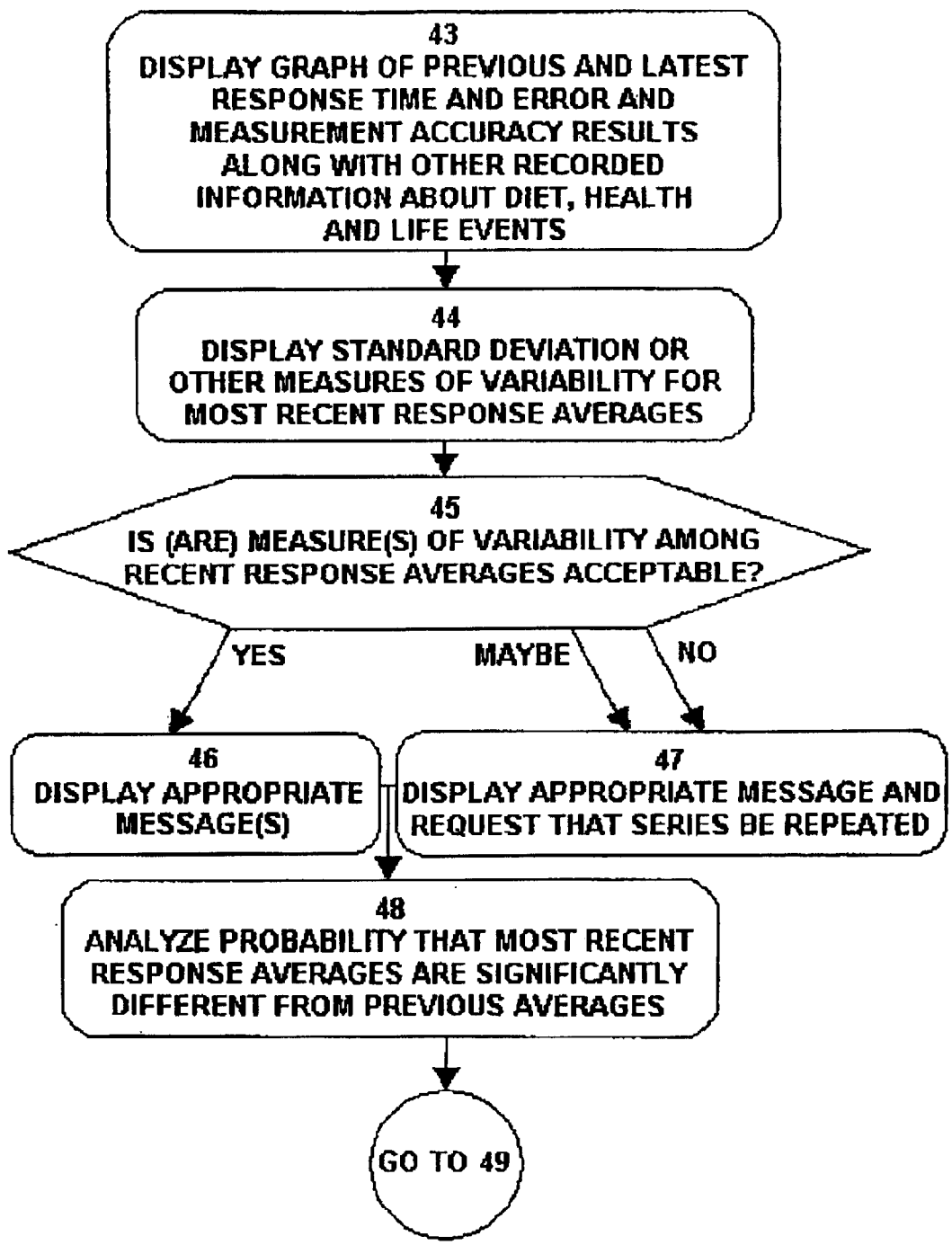
Figure 8C:
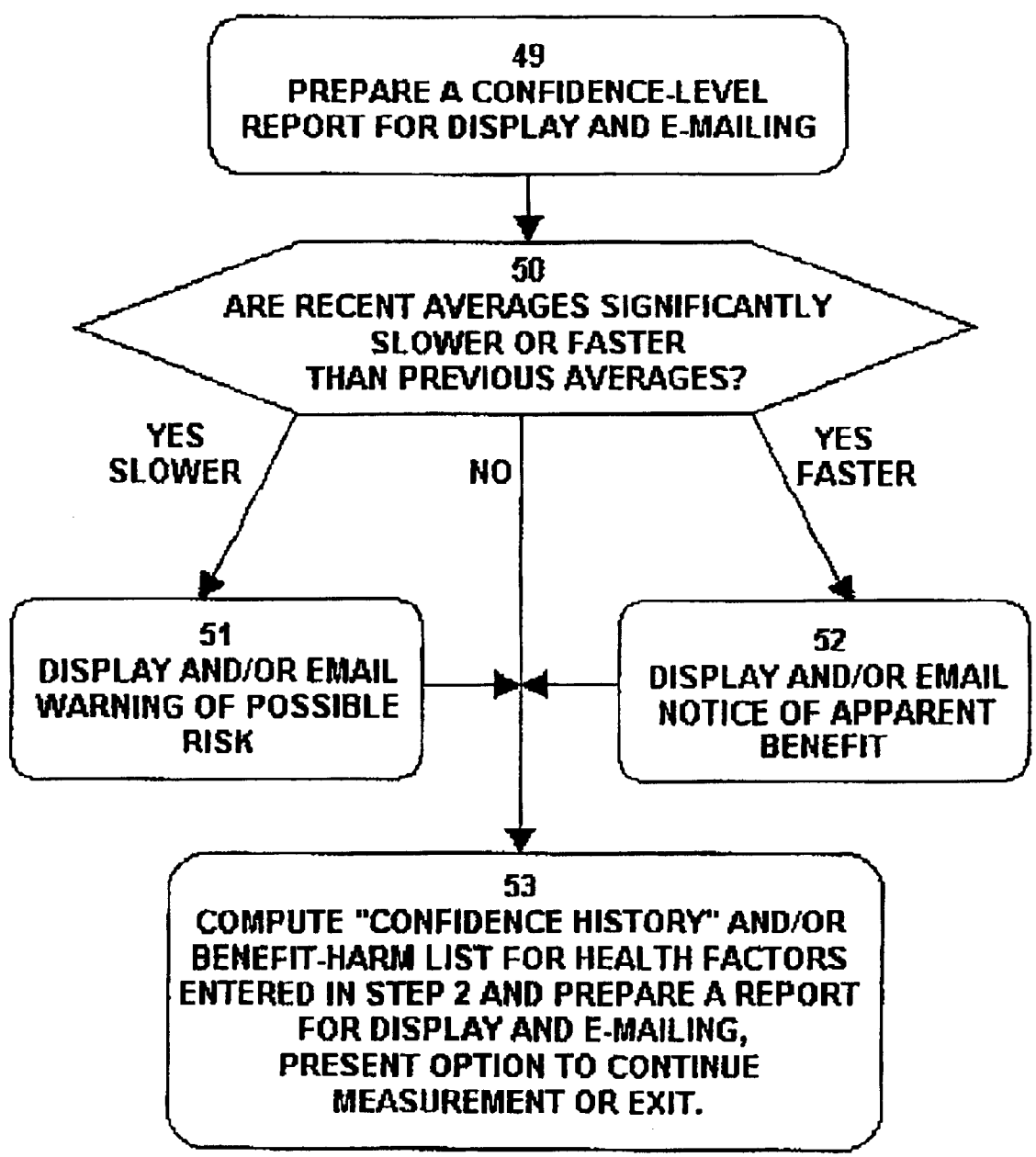

The steps of a preferred embodiment of the inventive method is presented with reference to the flow diagrams of FIGS. 3–5, the step numbers and titles refer to the numbered and titled boxes within the various figures.

Step 1: Display Instructions.

The source network entity (SNE) causes a digital image of test development system (TDS) to be embodied within a carrier wave and passed through the data distribution system (DDS) to the destination network entity (DNE). The DNE executes the instructions, including a session administration routine, comprising portions of the TDS. The Examinee receives instructions regarding the appropriate administration of the session. Appropriate instructions are retrieved from an instruction database by the session administration routine and displayed to the examinee.

This step is critical for measurement precision because examinees are instructed to make use of response time and error rate information during and throughout each measurement session and to maintain a more-or-less steady error rate so that results can be more precisely compared from one session to the next. Users are also told how to place their fingers directly over appropriate keyboard or other response keys so that they do not subsequently discover that a different finger placement improves their response time. They are instructed to use any of three alternative finger positions—including two intended specifically to be more comfortable for users with narrower and with wider fingers. Examinees are instructed to take whatever measures are necessary to obtain steady results—e.g. to test themselves until they have passed the rapid learning phase or "practice period" and have achieved a steady baseline, to obtain measurements at the same time of day, and to refrain from caffeine or alcohol consumption, etc.

Measurement system users who are instructed properly are less likely to discover, perhaps unwittingly or unconsciously, better strategies that change their response time and make results less consistent and less reliable. Users are also more likely to adjust their response speed and error rates more frequently if instructed to check several times during each measurement session and to use the response time and error rate information provided to adjust their response speed and error rate during the remainder of the measurement session so that they remain within a consistent, limited range.

Use of lower and upper error limits specifying a narrow range (rather than a broad range) ensures that users will frequently fall outside the recommended range and will make speed adjustments that will produce data on either side of the optimum error rate, so the average error rate remains consistent and response time data is more reliable. A single recommended error rate is not equivalent to a narrow acceptable range, since users will grow to accept error rates that are too high and too low and will make up their own personal ranges of acceptability that may change with time or mood and be less reliable than a specified acceptable range.

Alternative finger placements are provided so that users with large fingers need not squeeze their fingers together, ignore the discomfort while testing, and overcome the friction caused by squeezing. More comfortable finger placement frees users from this distraction and impediment to rapid responses and allows them to respond more reproducibly and reliably. A preferred embodiment employs at least two sets of alternative finger positions. In a preferable embodiment of the invention, test subjects are instructed to adopt the standard "qwerty" finger position, i.e., "asdf; lkj." The inventive method contemplates acceptable alternative finger placements using adjacent keys, e.g. "zxcv" and also non-adjacent, e.g. "axml" or "axnk" or "axbj."

Maintaining a finite, non-zero error rate is an aspect of the invention. Subjects are instructed to maintain responses within a limited range of error. A minimum error rate must be maintained. For each 20 keystrokes, the minimum number of errors should be at least three fewer than the maximum number of errors. Preferably, the lower error rate is 2 errors per 20 keystrokes and the upper error rate is 5 errors per 20 keystrokes. It is acceptable that the lower error rate is as high as 5 errors per 20 keystrokes and the upper error rate be 10 errors per 20 keystrokes so long as the upper bound differs from the lower by at least 3 errors per 20 keystrokes. The method will tolerate a wide range of error, and in fact, examinees are encourage to remain within a consistent and narrow range—choosing their own comfortable upper and lower limits so long as their upper and lower limits are 3 errors apart.

Step 2: Collect Health and Health Habit Information.

Instructions are displayed to the examinee directing the input of certain health and habit information. Collecting this type of information before testing begins is critical since test results may often bias self-perceived health and distort results. The information is collected to allow subsequent analysis of relationships between health habits, non-cognitive health and cognitive health that may allow users to adjust their habits to maximize both cognitive fitness and overall health. Health information has been collected prior to testing but never, to my knowledge, as a regular part of repeated testing to enable health and cognitive fitness to be optimized. Regular collection of both cognitive performance and health/health habit information is essential for statistical analysis of correlations between each, to determine if changes in health behavior precede changes in cognitive performance. The regular collection of health/health habit information as part of each measurement session is thus an aspect of the present inventive measurement system.

Step 3: Cache All Signals for Rapid Presentation.

"Caching" in the sense used here is the transmission of data for signals or stimuli to be presented (e.g., images of the numbers 0 through 9, letters, sounds, etc.) via the DDS, for example the Internet, for temporary storage on each DNE computer accessing the performance measurement web site (SNE). Delays in Internet transmission make it impossible to rapidly present signals without advance caching. And rapid presentation of signals is essential for precise response time measurement. If signals are not presented substantially instantaneously, then users will respond prematurely, or have their responses biased, when they see ⅛, ¼, ⅓, ½ (etc.) of a multi-part challenge signal as it is gradually displayed.

Prior art web sites require users to download and set up performance tests on their own computers, a long and arduous task that I believe most users will not complete, or else the sites use code-generated changes in background color that severely limit the possible range of challenge signals which can be employed.

Step 4: Set All Parameters to Initial Values.

Parameters are variables used in the program. Initializing variables for past results (response time and error rates) allows users to view constantly updated comparisons between past performance and present performance, and to adjust present performance to equal or improve on past results. In an alternative embodiment such comparisons are made during delays or breaks. In a preferred embodiment, parameter initialization allows for setting user expectations at the beginning of each session allows for more rapid and complete adjustment during the initial set of responses.

Step 5: Trans Form Prior Results.

Prior results are transformed into key descriptors like average, standard deviation, etc. for most convenient and understandable comparisons with results obtained during the present measurement session.

Step 6: Calibrate the Measurement Accuracy of Each Computer (DNE) Before Each and Every Response.

Users should not waste their time obtaining unreliable results simply because they computer is not measuring their response time accurately. Inaccuracy may be due to very temporary interference from other programs hidden in the "background". To detect such interference, a series of commands is executed and the time required for these commands to be completed is measured. If the difference between the expected execution time and the actual execution time (the measurement error) is too large, measurement is halted and a warning appears, advising the user of the problem. Whether the measurement error is acceptable or not, it is stored for comparisons with error in future sessions, and an average for each series of responses is computed and displayed so users can see immediately if slight interference has occurred even if the limit of acceptability has not been exceeded.

Step 7: Determine Acceptability of Measurement Precision.

The limits of acceptability should be sufficiently small to prevent statistically significant errors from occurring. Since typical users vary from day to day by up to 10%, a measurement error rate of 10% or less for each keystroke is acceptable provided that errors are consistently in one direction or are randomly high or low, and provided that the percentage error has been determined over a time period roughly equivalent to the time period required for a typical response. In other words the error in response time measurement should roughly correspond to the error in computer measurement for the following error analysis to be valid. Errors of 10% may seem unacceptably high however if 20 such errors are averaged they generally almost completely cancel, if errors are randomly high and low, resulting in an error of 0.5% or less. If measurement errors are consistently high across measurement sessions, then the change in response time between sessions will also not be affected by measurement error if errors are consistently high. For example, if user A requires an average of 35 centiseconds to respond on Monday, but the computer records 38.5% due to a 10% average measurement error, and if user A returns on Tuesday and averages 35.5% with the same measurement error of 10%, then his average on Tuesday will be 35.5×1.1 or 39.05. The observed change from Monday to Tuesday will be 39.05−38.5 or 0.55 centiseconds. The actual change was 0.5 seconds, so there was a measurement error of 0.05 centiseconds or only 0.14% of the average response time (0.05/35.5×100=0.14%) even with a 10% measurement error. Since only changes of 10% or greater are outside the normal day-to-day change, indicating perhaps the start of an adverse drug reaction or a large benefit from additional vitamin E consumed on previous days, an error of only 0.14% can certainly be ignored since it is only one seventieth as large as changes commonly encountered.

Some scientists may dismiss use of personal computers for accurate response time measurement because millisecond errors occur in transmission of keystrokes from keyboard to the computer. Such tiny errors are too large for these scientists to tolerate. Excessive concern about such minute errors may be one reason why response time measurements are not more widely investigated or used for health benefits. Given large day-to-day variations commonly encountered when users measure their response time over weeks, months and years, concern about errors so much smaller than actually observed changes seem inappropriate.

For these reasons, I believe the best cutoff point for acceptable error is relatively high (10%). Setting a high acceptability cutoff prevents users from encountering error warnings during every test session—an inconvenience that may add to the time and irritation associated with measurement and reduce use of the system, preventing fewer patient-users from monitoring potentially life-saving improvements or life-threatening decrements in their performance.

To ensure that errors do in fact cancel across measurement sessions, average errors for consecutive sessions must not change by over 2% or warnings are generated advising that measurement errors be more tightly controlled.

Step 8: Display Accuracy Warning.

Where a measurement accuracy warning is generated, users are advised to close other programs, to check that the change from each session to the next is less than 2%, or to call a webmaster or measurement advisor for additional assistance reducing measurement errors.

Step 9: Select the Signal to be Presented.

To allow repeated use of the measurement site, challenge signals presented to the user must be different during each response series, random numbers are used to select from among possible challenge signals. As used herein, the term challenge signal may refer to a single character, for example the numeral "1". However, the term challenge signal may refer to a sequence of characters, for example the string "371."

Step 10: Is the Signal the Same as the Previous Signal?

The term response refers to keystroke(s) and/or mouse clicks made by examine following presentation of a challenge signal. For example, where the numeral "1" is displayed, a keystroke corresponding to the numeral "2" would represent an incorrect response, while a keystroke corresponding to the numeral "1" represents a correct response. When preparing to response, nerve and muscle cells may be "primed" or ready to respond more rapidly where an identical challenge signal is presented several times in sequence. Therefore, signal repetition is to be minimized. It is also important to prevent alert users from anticipating a changed challenge signal where it is known signal repetition is not permitted. In a three-choice response time test, for example, if a 1 is presented then the user may expect a 2 or a 3, knowing 1 cannot occur again, so the number of choices is reduced from 3 to 2, causing the test to be in effect a two-choice response time test, which has different and in some respects less desirable properties in comparison with a three-choice test. Preventing repetition is particularly important for number recall tests, during which users who cannot remember whether a 5 or 6 was used in position 4 of a 5 digit sequence may reason that the correct answer is 6 because the third digit was 5 and the 5 could not have been repeated. To rule out anticipation and reasoning of this kind, the probability that a signal is repeated is reduced by three fourths (using random numbers to determine whether repetition is allowed each time) so that the effects of repeated numbers, anticipation and reasoning as described are all muted.

Step 11: "Softshift" the Signal.

As used herein the term softshifting refers to the procedure to adjust challenge signals that violate rules governing permitted challenge signal sequences. Initially a random challenge signal is generated and tested to determine whether the challenge signal so generated violates a signal sequence restriction rule. Where the challenge signal has been determined to violate a sequence restriction rule, a softshift adjustment procedure is invoked. Softshifting comprises the steps of (a) generating a random test number, (b) comparing the random test number to a pre-set threshold number, (c) where the random test number is greater than the threshold number, generate and display an alternative random challenge signal. Where the test number is less than the threshold number, display the original challenge signal. The invention is not limited to a specific softshift algorithm. The critical feature is to change the challenge signal, some of the time, but not every time, said challenge signal violates signal sequence restrictions.

If a signal is repeated, or an element of a multi-component signal is repeated, a random number is selected to indicate whether repetition is permitted in this instance. There is no "hard" rule that repetition is forbidden. There is only a "soft" rule, with regular exceptions, that indicates a change is required most of the time. If this random number indicates that a change must occur, the signal is shifted to an equivalent alternative, perhaps to a number one larger than the original signal or to a symbol selected at random. This process is called a "softshift." Its purpose is to prevent the examinee from counting signal occurrences, trying to outguess and anticipate the signal selection system, and being distracted and having their performance affected by guessing while signals are being presented.

Step 12: Has the Signal Been Selected too Often?

Random choices of signals sometimes will cause one signal to be selected within a series significantly more often than others, distorting average response time or recall results, increasing between-series standard deviations and reducing the level of confidence possible for any changes observed. To prevent this from occurring, a limit is placed on the number of times each signal can be selected during each series—however the limit is a soft limit, allowing exceptions, to discourage signal counting and anticipation that frequently-used signals cannot be used again (similar to card counting).

Step 13: Has the Difference Between the Selected Signal and the Previous Signal Occurred too Often During the Current Series?

Where challenge signals increase by some number, for example 1, twice in a row, a similar change may be anticipated, affecting response time or recall accuracy. A soft limit is therefore placed on the occurrence of identical changes between consecutive signals and also within a series of signals. Changes may involve consecutive responses with the left or right hand, or involve responses with index and middle fingers. During recall measurements, this type of limit reduces the likelihood of series like 2, 3, 4 or 4, 6, 8 or 3, 6, 9 or corresponding descending series, or series like 1,3,1,3 or 8,4,8,4 or red green red green that can be easily remembered and may enable longer-than-usual numbers to be recalled. Such series can be recognized by testing to determine whether (i) the difference between consecutive numeric signals is the same, (ii) a signal is the same as the signal to slots previously and the previous signal is also the same as the signal two slots before said previous signal Step 14: Determine Whether the Current Challenge Signal in Combination with Previous Signals Form a Forbidden Series.

Occurrence of a leading zero as the first digit of a series, or of a one and a nine as the first two digits of a series, may enable number series to be recalled more easily and distort recall measurements. (19. can be recalled as a year like 1945 or 1963 if linked with very memorable events like the end of WW II or Kennedy's assassination.) To reduce the frequency of such distortion, specific series can be detected and their occurrence subjected to softshifting so they are less frequent and distortion is reduced.

Step 15: Cache the Challenge Signal and the Frequency that the Signal has been Presented.

This is an essential part of signal balancing (ensuring approximately equal numbers of each possible signal in each series).

Step 16: Select the Delay Prior to Signal Presentation.

Many response time tests incorporate a variable delay before signal presentation to prevent anticipation of when presentation will occur and therefore prevent a response prior to signal presentation. Random numbers are used to control the delay time to avoid obvious patterns. Long intermediate and short delays can be counted and subjected to frequency limits as described above Step 17: Determine Accuracy of Computer Response during the Delay Prior to Presentation of Each Signal.

In a preferred embodiment of the present invention the accuracy of computer response is determined during the delay prior to presentation of each signal.

Step 18: Present the Signal from a Local Cache.

In a preferred embodiment of the present invention, image and sound files, used to generate challenge signals, are cached in the DNE local memory. Local caching allows for substantially instantaneous retrieval and presentation.

Step 19: Measure Start Time.

In a preferred embodiment, the response time is measured after the challenge signal has been presented. In the preferred embodiment, the challenge signal is generated, and where necessary, softshifted. The presentation delay time is generated, and where necessary, softshifted. Following expiration of the delay time, the challenge signal is presented and the response start time determined and cached.

Step 20: Eliminate Active Commands During Dwell Period.

In a preferred embodiment, essentially immediately upon presentation of a challenge signal, keystroke capture mode is activated so that the next keystroke activates subsequent steps. In order that there be minimal interference with keystroke capture commands, it is essential that no other computations, other than background environment chores beyond browser or Response Speed and Memory Measurement System (RSMMS) control, be performed during the dwell period. In a preferred embodiment of the present invention, keystroke-capture software and precise control of active and inactive periods are used so that other keystrokes are not misinterpreted as responses.

Step 21. Capture the Response Keystroke and Determine the Response Time.

In a preferred embodiment, both the symbol encoded by a responsive keystroke (or mouse click) and the elapsed time following presentation of the challenge signal are captured. It is preferred that the response time is determined prior to the execution of any other commands. In a preferred embodiment, the response and response time are cached for later analysis.

Step 22: Determine Whether Response is a Command.

In a preferred embodiment, certain keystrokes are interpreted as commands. For example, where the letter "b" is pressed, the program is set to recognize that the user wishes to take a break and the response is not counted. Other commands can conveniently be inserted here. Care must be taken not to allow commands that may distract users and influence subsequent responses.

Step 23: Execute the Command.

Care must be taken that executing commands input at step 22 does not start processes that may continue and interfere with subsequent measurement accuracy. For example, other windows must not be opened and left open since the burden of window management will change and the additional interference may cause computer response time measurement errors.

Step 24: Is the Response Time too High or Low?

Lucky responses occasionally occur when users start pressing the correct key even before a signal has been presented. Responses below a threshold are discarded. In an embodiment of he invention, the threshold is set at 10 centiseconds. Distractions may also cause unusually long responses that are also discarded. The longest permitted response for a three-choice or four-choice response time measurement system should be about 2 seconds for older users or users with health conditions that delay response time, and should be 1 second for younger, faster users. Thresholds for other response time tests must be chosen specifically for each test.

Step 25: Display Response Time Out-of-Bounds Message.

It is important to indicate to users whether response times are out of bounds so they can learn how long to wait before pressing subsequent keys if they are temporarily distracted for any reason or if they press keys only partly and wish to have the response ignored rather than captured as an unusually slow response or incorrect response. In an embodiment of the invention, users simply wait for 2 seconds then press the correct key to continue signal presentation for the rest of the series. No time is recorded if users wait longer than the upper limit for responses set in set 24.

Step 26: Is the Response Correct?

In an embodiment of the invention, incorrect responses are captured so that error patterns can subsequently be analyzed, however in a preferred embodiment, incorrect responses do not count toward the total number of (correct) responses required for each series of responses. It is therefore necessary to detect incorrect responses and make certain the corresponding response times are not used to compute the current series average, and to decrease the response counter so that the correct number of accurate responses are collected during the current series.

Step 27: Display the Incorrect Response Image and Increase the Incorrect Response Counter.

Responses are collected so rapidly that it is often difficult for users to realize when they perform incorrect responses. Recognizing errors is of course essential for maintaining an error rate above a lower limit and below an upper limit, so a brightly colored message is displayed within the signal presentation area (where it cannot be missed) to alert users each time an error is made.

Step 28: Is the Error Rate Among Recent Responses Over a Threshold?

Users often hit bad streaks where responses correspond to previous rather than current signals, or for other reasons a run of errors are made. In a preferred embodiment of the invention, users are helped to "snap out" of these error streaks. A message is displayed and testing is interrupted where excessive (e.g. more than 4) errors are made within the preceding 5 to 10 responses. Use of "error-cluster buster" mini-breaks is an aspect of a preferred embodiment.

Step 29: Display a "Take a Break" Message.

Where excessive errors are detected during step 28, a preferred embodiment invokes a routine to advise users to "take a moment to wriggle your fingers. Then press OK to continue."

Step 30: Increment the Correct Response Counter.

It is important for users to see how many responses they have made in each series, and how many errors, to determine whether their current error rate is acceptable, or whether more or fewer errors should be made. It is therefore important not only to increment the response counter after each response, but also to display the result clearly.

Step 31: Compute and Display the Average Response Time and Other Indicators of Error Rates and Computer Measurement Accuracy.

In a preferred embodiment of the invention, the average response time and other indicators of error rates and computer measurement accuracy are computed and displayed after each keystroke. This must be done after each keystroke if users are to be able to adjust within each series of responses to maintain or exceed speed and accuracy levels achieved in the past.

Step 32: Is the Average or Score for the Most Recent Series Much Higher or Lower than the Previous Average?

If there is a large difference between the current and the preceding result, a notice pops up advising the user of the change, so that they can determine if the change is reproducible by completing additional series, and if yes so that can take appropriate action. A preferred embodiment calculates differences between scores achieved between consecutive response series within each measurement session Step 33: Display a Message Related to the Observed Change in Score or Average.

Where a decline in health status is observed and confirmed by additional measurement, extra cautious driving or a call to a professional health advisor may be appropriate. Where improved health status is noted, additional health habit adjustments to enhance the improvement may be appropriate, again after checking with a professional health advisor. A preferred embodiment displays appropriate motivational messages related to improvements or declines in health status, as determined by variations between consecutive response series within a measurement session.

Step 34: Is the Total Number of Responses During the Current Series Equal to the Limit for the Series?

Where, for example, 20 of 20 desired correct responses have been obtained during the current series, then the series is over and additional reports are prepared while the user has a small rest period. If fewer than 20 correct responses have been obtained, then the program loops back to step 6 to obtain the required responses.

Step 35: Increment the Series Counter.

Counting the number of series is important because users occasionally lose track of how many series they have performed. Reminding them may help prevent over-testing, eyestrain and mental fatigue that will discourage the repeated testing so critical for long-term measurement accuracy.

36. Compute a "Cleaned" Average, Standard Deviation, Split Half Error Rate and Other Measures of Response Speed and Accuracy and Computer Measurement Accuracy.

In a preferred embodiment, a cleaned average is computed. In a preferred embodiment, a cleaned average of response is determined excluding values for the fastest and slowest responses. Since on average more slower-than-average responses occur compared to faster-than-average responses, more slow responses are rejected in each series than fast responses.

In a preferred embodiment a "split half" average is determined. Determination of the difference between the average of odd responses minus the average of even responses (e.g., the average response time of responses 1, 3, 5, 7, 9, 11, 13, 15, 17 and 19 minus the average of responses 2, 4, 6, 8, 10, 12, 14, 16, 18 and 20) allows speed fluctuations due to second-by-second changes in mental fatigue, eye strain, motivation to respond rapidly or accurately, etc. to be canceled since both averages are affected more or less proportionately. If the percentage difference between these odd/even split half averages is too high, then the results of the series may be too inconsistent for accuracy and a message pops up advising the user to perform another series or contain an adviser to determine what is causing the split half error rate to be higher than acceptable.

A preferred embodiment for memory evaluation purposes defines a score for any measurement session as longest series recalled n-times consecutively. Where n is some pre-determined integer, for example 2 or 3. In an embodiment score is defined as the average of the fastest n consecutive response series. Where such an n-series score is determined, the score should be updated and displayed so users can see clearly where they stand compared to previous results.

37. Store All Results.

If the accuracy and speed of present results are to be compared with future results, with adjustment for variations in computer measurement accuracy, each data set must be stored for future retrieval and comparison. No other Internet or non-Internet RSMMS currently stores information in packets that include the signal, the response, the response time and the computer measurement accuracy result obtained just before signal presentation, so storage of this type of data packet is therefore claimed as a unique feature of this invention.

If space is limiting and more compact storage is necessary, then only series response time averages, total errors per series, and the average of computer measurement accuracy for each series need be stored. Information packets with these three items of information are also claimed to be unique features of the RSMMS being patented.

Step 38: Is the Most Recent Series of Results Acceptable?

In a preferred embodiment, an acceptable series is defined as, for example, the number of errors being within pre-defined bounds; and/or the split half error less than a threshold value; and/or computer measurement errors less than a pre-determined threshold. Where results are unacceptable, a warning is displayed recommending that the series be repeated.

Step 39. Display Appropriate Message if Data are Acceptable.

It is important to give users encouragement and a pat on the back for work well done, to add some fun to the process so they will be more likely to return for follow-up measurements and build a more accurate data set, add to their own understanding of connections between their personal health habits and cognitive performance, and also add to a general body of understanding that may benefit many others. Giving users a pat on the back several times with each measurement session concerning several independent measures of data acceptability is to my knowledge unique to this RSMMS and is therefore claimed as a unique feature of this invention.

Step 40. Display Appropriate Message if Data are Borderline Unacceptable or Acceptable.

Suggest repeating the last series, perhaps reducing interruptions that cause attention to lapse, or calling an advisor to discuss persistent problems with data acceptability. Giving users messages concerning how to improve several independent measures of data acceptability is to my knowledge unique to this RSMMS and is therefore claimed as a unique feature of this invention.

Step 41. Is the Series Total Prior to Comprehensive Graphing and Evaluation Equal to the Required (Upper or Lower) Limit?

A graph of prior and current results can be prepared after each series of responses, or after every two, three, four or five series. If the number of series completed equals the limit needed for graphing, then the graph and associated analysis should be prepared. The best value for this limit is simply 1, since graph preparation then gives users a break after each series has been completed and reduces between-series fatigue and (proactive) interference.

This step is not a unique feature of this RSSM system and is only claimed as part of a unique combination of features comprising the invention being patented.

Step 42. Save, then Initialize within Series Counters.

After each series is complete, the total errors, average response time and average computer measurement error must be stored for future use and the values must be initialized so the next series begins from zero or no value for each measure of performance determined by each series of responses. This step is not a unique feature of this RSSM system and is only claimed as part of a unique combination of features comprising the invention being patented.

Step 43. Display a Graph of Previous Results.

After each series or several series, graphing results allows users to see at a glance if their current responses are worse, better or the same as previous responses. Response time and error rates should be presented, or health or health habit data should be displayed for easy examination. Giving users graphs of both past and present results is to my knowledge unique to this RSMMS and is therefore claimed as a unique feature of this invention.

Step 44. Display the Standard Deviation or Other Measures of Variability for Recent Averages.

It is best to display measures of between series variability along with the graph of past and present results so that users can see the variability at a glance and decide whether additional data should be obtained. Controlling measures of between-series variability (e.g. minimizing the standard deviation among the most recent 5 series of 20 responses) allows users to monitor and possibly control factors that operate over many series, just as measures of within-series variation (e.g. the standard deviation within results from one series of 20 responses) allows users to monitor and possibly control factors that operate within each series, like very short term changes in concentration or interruptions from background noise or occasional interference from background computer programs. Giving users measures of variation that span both past and present results is to my knowledge unique to this RSMMS and is therefore claimed as a unique feature of this invention.

Steps 45, 46 and 47. Are Measures of Variability Among Recent (Past as Well as Present) Series Averages Acceptable?

If not, display appropriate messages as in steps 38–40. Since factors that affect past vs. present results operate over much longer time periods compared to factors that cause variation within a series (i.e. within a ten- to 15-second period), it is appropriate to mention possible causes of between-session variation like changes in the amount of exercise or sleep from day to day which can be minimized for more consistent cognitive performance. Giving users messages concerning variation across both past and present results is to my knowledge unique to this RSMMS and is therefore claimed as a unique feature of this invention.

Step 48. Analyze Probability that Recent Results are or are not Significantly Different from Previous Results.

To major goals of statistical analysis are to determine whether a steady baseline has been obtained before a health supplement, dietary change or medication is tried, and to determine whether changes observed after a change has been made are in fact statistically significant or perhaps are simply part of normal, random variation. Both kinds of statistical tests are provided on the RSMMS web site for visitors to conveniently use.

Baseline adequacy is determine by a t-test for paired data performed to determine whether recent results will be statistically different from equivalent results (with roughly the same standard deviation) if a change of 1%, 3% or 6% occurs. Data pairing for the "paired" t-test is based on order of series averages within each measurement session: e.g., the first series result on Monday is paired with the first on Tuesday, the second series result on Monday is paired with the second on Tuesday, etc., so that the effects of progressive fatigue and warm-up over the series within each measurement session can be canceled to some degree.

A paired t-test for the most recent n series vs. the previous n series is also available (where n is selected by the user) to determine if recent series are significantly different from the preceding series.

And a multiple t-test "Search for Significance" performs paired t-tests on the most recent 3, 4, 5. and preceding 3, 4, 5. series averages (until the end of stored data is reached) and reports any significant changes (above a cutoff provided by the user).

The ready availability of significance tests for baseline adequacy and evaluation of observed change is to my knowledge unique to this RSMMS and is therefore claimed as a unique feature of this invention.

Steps 49, 50, 51, 52, 53. Prepare Easy-to-Understand Confidence Levels for Display and e-mailing Along with Appropriate Messages.

Most users are not statisticians, so a percentage confidence in any observed change is computed from the p values generated by the t-test equations. Percent confidence=(1−p value)×100. A plain English statement about the degree of confidence is prepared, displayed and also stored for automatic or manual e-mailing. Preparation of easy-to-understand statistical reports based on percent confidence is to my knowledge unique to this RSMMS and is therefore claimed as a unique feature of this invention. Preparation of easy-to-understand reports for e-mailing to health advisors or personal health data centers is to my knowledge unique to this RSMMS and is therefore claimed as a unique feature of this invention.

Two kinds of "confidence history" are also available at the web site, where "confidence history" means a listing of confidence levels that the most recent 3 results are significantly different from the previous 3, that the last 4 are significantly different from the previous 4, that the last 5 are . . . up to the highest number permitted by stored results—or that the most recent n results (n=3, 4, 5 . . . ) are significantly different from the previous n, that the n results beginning with the 2nd-most-recent-result are significantly different from the preceding n results, that the n results beginning with the 3rd-most-recent-result are significantly different from the preceding n results . . . back to the start of the data set.

The following sample output illustrates the kind of results obtained by a preferred embodiment of the present inventive RSMMS:

Your response time average was 32.83+/−3.2% (20 correct/5 incorrect).

Your odd/even ratio for this set of 20 was 1.016.

Computer measurement errors averaged 0.13%.

Please consult a health professional before interpreting these results.

Response Time Table for Visitor
Sep. 22, 1999 06:55:05

| Date/hr/min/sec | Response Time (and health ratings) | Bar chart [Not shown] |
|---|---|---|
| 1) Sep. 15, 1999 10:10:55 | 29.63 (2/3) | |
| 2) Sep. 15, 1999 10:28:14 | 31.61 | |
| 3) Sep. 15, 1999 10:29:02 | 30.82 | |
| 4) Sep. 15, 1999 10:29:59 | 30.24 | |
| 5) Sep. 15, 1999 10:31:16 | 28.8 | |
| 6) Sep. 16, 1999 08:36:30 | 30.83 (3/3) | |
| 7) Sep. 16, 1999 08:37:19 | 30.63 (3/3) | |
| 8) Sep. 16, 1999 08:38:47 | 31.66 (3/3) | |
| 9) Sep. 16, 1999 08:39:57 | 31.83 (3/3) | |
| 10) Sep. 16, 1999 08:41:32 | 31.61 (3/3) | |
| 11) Sep. 17, 1999 10:40:48 | 30.48 (4/3) | |
| 12) Sep. 17, 1999 10:42:03 | 29.43 (4/3) | |
| 13) Sep. 17, 1999 10:47:24 | 29.86 (4/3) | |
| 14) Sep. 17, 1999 10:48:29 | 30.85 (4/3) | |
| 15) Sep. 17, 1999 10:49:38 | 29.24 (4/3) | |
| 16) Sep. 18, 1999 10:29:20 | 29.24 (2/1) | |
| 17) Sep. 18, 1999 10:30:34 | 31.41 (2/1) | |
| 18) Sep. 18, 1999 10:31:42 | 32.01 (2/1) | |
| 19) Sep. 18, 1999 10:32:51 | 31.83 (2/1) | |
| 20) Sep. 18, 1999 10:33:48 | 31.83 (2/1) | |

-continued

Response Time Table for Visitor
Sep. 22, 1999 06:55:05

| Date/hr/min/sec | Response Time (and health ratings) | Bar chart [Not shown] |
|---|---|---|
| 21) Sep. 19, 1999 09:20:57 | 31.85 (3/2) | |
| 22) Sep. 19, 1999 09:22:42 | 30.02 (3/2) | |
| 23) Sep. 19, 1999 09:24:11 | 31.46 (3/2) | |
| 24) Sep. 19, 1999 09:25:29 | 32.23 (3/2) | |
| 25) Sep. 19, 1999 09:26:39 | 31.5 (3/2) | |
| 26) Sep. 21, 1999 09:01:51 | 29.26 (3/3) | |
| 27) Sep. 21, 1999 09:03:15 | 32.04 (3/3) | |
| 28) Sep. 21, 1999 09:04:22 | 29.66 (3/3) | |
| 29) Sep. 21, 1999 09:05:26 | 31.41 (3/3) | |
| 30) Sep. 21, 1999 09:06:41 | 31.05 (3/3) | |
| 31) Sep. 22, 1999 06:49:07 | 28.82 (2/2) | |
| 32) Sep. 22, 1999 06:50:42 | 28.26 (2/2) | |
| 33) Sep. 22, 1999 06:52:32 | 30.05 (2/2) | |
| 34) Sep. 22, 1999 06:53:49 | 33.05 (2/2) | |
| Most recent result: | 32.83 (2/2) | |

Please keep a separate record of these results in case your data "cookie" is erased.
To print these results, click on File and Print.
Avg for last 5 visits: 30.60+/−7.29%. SDev is good.
Data cache: 1017 bytes out of 4,000.

Baseline confidence analysis: The ratio of your first 17 to your second 17 response times is 30.48/30.96 or 0.984. This ratio is not significantly different from 1.00 according to a split-half t test for paired data. It thus appears that you have obtained stable baseline data.

If you obtain the same amount of data during the next month and your average is shifted by 1%, then the observed change will be significant at a confidence level of 89.21%. If the shift is 3%, then your confidence level will be 99.8%. And f the shift is 6% or 15% your confidence will be 99.9% or 99.9%.

Significance Test: The ratio of the previous 10 response times to your most recent 10 is 31.33/30.64 or 1.022 (confidence=91.7%). Your most recent 10 results appear to be significantly different from the previous 10 results. Please send this report to your professional health advisor if you wish to discuss changes in your medication or supplements. Note: Due to rounding and interpolation errors, calculated levels of significance are approximate. If you have questions about this statistical test, please send today's results to VitaminEstudy@go.com. Be sure to include your E-mail address for a reply.

Significance Report:

The ratio of the previous 8 response times to your most recent 8 is 31.27/30.64 or 1.020 (confidence=74.8%).

The ratio of the previous 9 response times to your most recent 9 is 31.22/30.79 or 1.017 (confidence=76.2%).

The ratio of the previous 10 response times to your most recent 10 is 31.33/30.64 or 1.022 (confidence=91.7%).

The ratio of the previous 11 response times to your most recent 11 is 31.08/30.72 or 1.011 (confidence=73.0%).

The ratio of the previous 16 response times to your most recent 16 is 30.62/30.95 or 0.989 (confidence=82.7%).

The ratio of the previous 17 response times to your most recent 17 is 30.62/31.00 or 0.987 (confidence=87.4%).

To send your results to a physician, pharmacist or other health advisor, enter their E-mail address in the space below. Then enter your code name, E-mail, phone number or other information they require on the next line.

Send my results to this E-mail address: [input box]

My code name, E-mail, phone or other info: [input box]

Remarks: [input box]

[Send button]
[Return to Measurement Page button]
[End of sample output]

According to a preferred embodiment of the invention, the examinee is offered the option to prepare ratings for each food, supplement, medicine, health habit or other factor, listed by the examinee, to indicate which are associated with improvement or decrement in examinee performance. The result of this calculation is a complete or partial list of all health factors mentioned (during step 2) prior to performance measurement and an associated score for each item on the list (e.g. a positive number indicating the degree to which performance improvements occurred afterward, or a negative number indicating that performance was poorer afterward). Partial lists would include the top n (e.g. 10) foods, etc. and the worst n (e.g. 10) foods, etc. The value of partial lists is that most of the statistically insignificant benefit/decrement values are omitted. The key to this benefit-decrement rating is relatively precise time-date information for both health factors and performance results, and dose and frequency-of-use information for health factors whenever possible or convenient. Time-date and dose information allows the relative degree of association between each factor and performance results to be adjusting in much the same way the inventor believe collections of nerve cells form connections between potentially related events or discharge patterns. The benefit-decrement calculation algorithm is simply to determine the change in performance (after vs. before each factor exerted possible influence), add up all these changes for each factor, weight the magnitude of the associations according to the difference in time between performance measurement and the health factor, and also weight the magnitude of each association according to cumulative dose if dose information is available. Weights for each food, medicine and other health factor need not be the same. Associations may be weakened by the simultaneous presence of several of the health factors under evaluation. Further description of the benefit-decrement calculation algorithm is provided by the "optimization" code provided below.

Sample Output Obtained from a Preferred Embodiment of the Invention:

Items listed first appear to raise the selected health measure.

| Food/beverage | Rating |
|---|---|
| EGGS | 3 |
| ORANGE-JUICE | 3 |
| TEA | 1.5 |
| APPLES | 1.28 |
| BREAD | 1.28 |
| OATMEAL | 0 |
| MILK | 0 |

Items listed last appear to lower the selected health measure. Send Email copy to: [Email address box, with previous address automatically recalled] [End of sample output]

Importance of Health Data/Performance Data/Benefit-Decrement Reports:

The direct linked between measurement precision and combined collection of health habit/food data and performance data and preparation of benefit-decrement reports should be emphasized. RSMMS users who do not see relatively rapid results linked with documented benefits will not return to obtain the additional data that enables more precise measurement averages to be determined.

How to Make the Invention:

According to a preferred embodiment of the invention, computer code for Internet and non-Internet embodiments are provided. Some sections will run without adaptation if the following instructions are followed, however other sections (e.g. those involving the CGI code) require computer specific directories and/or Internet locations to be inserted. Those persons of reasonable skill in the programming arts will understand from the present disclosure how to adapt the code to a given computer environment.

The computer code supplied is illustrative of a preferred embodiment. The computer code should not limit in any way the scope of the claims since it represents only one implementation of the more general methods claimed.

1) Type or copy into a text-format file the HTML and JavaScript code (or equivalent code) for each web page provided below and save each page under the exact file name provided in the page title (or other file names provided that every page name reference in the code has been changed accordingly) on the c: drive of a Windows 95, 98, NT or equivalent computer system.

2) Change the action commands for each form (<FORM ... ACTION=specify a database or e-mail address here>) in each of these HTML files to specify a database or e-mail address to which data can be sent—or else disable all submit commands.

3) Prepare or copy images of the following or equivalent images and save them under the names indicated below on a Windows 95, 98, NT or equivalent computer system. Signal images to be displayed prior to each response can be prepared at the exact height, width, color and design of images available at the inventor's web site (to be listed on major search engines under the key words Response Speed and Memory Measurement System after this patent has been approved) however different sizes, colors and designs can also be employed.

Required images include:

Images of the permitted challenge signals. Said images may comprise the numbers 0 to 9 and/or other signal images, depending on the signals desired;

An image indicating that the previous response was incorrect;

An image requesting that the user "please wait" for scheduled feedback to be prepared and displayed;

A blank image to be displayed before the program starts;

An image showing proper finger placement during each response series, for the instruction page. This finger-placement image may be different for each test within the RSSM system, and may not be needed for some tests, like number and word recall, for which specific finger placement is not required.

Unless the code for each page is adjusted, images should be named:

num0.gif
num1.gif
num2.gif
num3.gif
num4.gif
num5.gif
num6.gif
num7.gif
num8.gif
num9.gif
numBlank.gif
numEnd.gif
numError.gif
numWait.gif Site specific images and images explaining different measurement options for the main entrance page can be named as indicated below. In the following non-limiting embodiment, letters represent the following: chs is for Connecticut Healthspan System (a system for increasing each person's span of healthy years, as well as lifespan)—these letters identify all image-links in the central area of a general access page linking to all measurement options currently hidden beneath the choice response time measurement page; jts—join the study—the image that links to a description of vitamin and herb study options; srt—simple reaction time, a response time test that has just one signal and one response (very simple); crt—choice reaction time, a response time test with 2, 3, 4 or more signals and a different response for each; pet—planning and execution time, a relatively complex response time test that involves planning and execution of a series of responses to each signal; ms—math speed; stm—short-term memory, for numbers; mss—memory scanning speed; hr—health report—this image links to a page that allows daily, weekly . . . health reports to be filed on-line.

For links to a tour of the site:

Tour.gif
Tour2.gif

For descriptions of each measurement option:

chsBlankText.gif
chsJtsText.gif
chsStudiesText.gif
chsHR1Text.gif
chsSrtText.gif
chsCrtText.gif—for Response time
chsPetText.gif
chsMsText.gif
chsMssText.gif
chsStmText.gif For image-links to each measurement option (if you click on each image, the web browser opens the corresponding measurement page):

chsjts1.gif
chssrt.gif
chscrt.gif—for Response time
chspet.gif
chsms.gif
chsmss.gif
chsstm.gif
chsjts2.gif
chssrt2.gif
chscrt2.gif
chspet2.gif
chsms2.gif
chsmss2.gif
chsstm2.gif
chshr11.gif
chshr12.gif Optional Sounds Include:

Four or more sound files in .wav format are recommended. These sound files can be any sounds desired, each to trigger 1 or a combination of responses, but should be short segments to avoid unnecessary delay and annoyance while the signal sound is completed. If only simple auditory response time is to be measured, then just a single sound file is needed. Note: To reduce downloading time, sound options are not included in Refcrt22.htm so a different version, Refcrt21.htm, is also included below for those who wish to adapt the trimmed version to include sound signals. This version also contains softshift code for reducing repeat signals, etc.

Sound file names are:

sound0.wav
sound1.wav
sound2.wav
sound3.wav
sound4.wav
sound5.wav
sound6.wav
sound7.wav
sound8.wav
sound9.wav Of course these and all other image and variable names can be changed to equivalent, more descriptive names.

It will, therefore, be appreciated by those skilled in the art having the benefit of this disclosure that this invention is capable of producing A computer based system for testing the cognitive performance of at least one examinee. Although the illustrative embodiments of the invention are drawn from the internet arts, the invention is not intrinsically limited to that art. Furthermore, it is to be understood that the form of the invention shown and described is to be taken as presently preferred embodiments. Various modifications and changes may be made to each and every processing step as would be obvious to a person skilled in the art having the benefit of this disclosure. It is intended that the following claims be interpreted to embrace all such modifications and changes and, accordingly, the specification and drawings are to be regarded in an illustrative rather than a restrictive sense. Moreover, it is intended that the appended claims be construed to include alternative embodiments.

CD-ROM APPENDIX

Java code, according to a preferred embodiment of the present invention, was submitted as a floppy-disk appendix, as part of the original submission of the instant application. In order to comply with 37 CFR §1.52(e), the code is hereby submitted as a CD-ROM appendix. The CD was created on a Dell OPTIPLEX GX260® with an Intel Pentium 4® CPU. The operating system was Microsoft Windows XP Professional®. The CD was created on Mar. 26, 2003, with Roxio Easy CD Creator 5 Platinum®. The code file originally submitted with the application is:

Code-Original-Submitted-With-Application-Num-09-861,768.doc-951 KB.

The CD contains two additional files, each containing identical code to the original submission. The files have line numbers included to facilitate searching.

Code-Numbered-for-Application-Num-09-861,768.doc-964 KB

Code-Numbered-for-Application-Num-09-861,768.rtf-531 KB

What is claimed is:

1. A computer based method for testing the cognitive performance of at least one examinee, said method comprising:

providing a computer based testing system comprising:
at least one source network entity having machine readable instructions, at least one test development system, local memory, and a plurality of executable files stored in said memory; at least one data distribution system logically connected to said source network entity; at least one destination network entity (DNB) logically connected to said data distribution system, wherein said DNE has local memory;

providing a computer readable signal train comprising:
said at least one set of instructions, said at least one test development system and said plurality of executable files;

transmitting said computer signal train to said data distribution system;

embodying said computer readable signal train in a carrier wave;

distributing said carrier wave embodying said computer readable signal train to said DNE;

performing said test development system by said DNE, including displaying instructions and challenge signals to said examinee;

capturing examinee responses to said challenge signals; and calibrating said DNE during the delay prior to presentation of at least one said challenge signal.

2. A computer based method for testing the cognitive performance of at least one examinee, according to claim 1, wherein calibrating comprises the steps of:

(a) recording a first time stamp;

(b) pausing for a pre-determined delay time;

(c) recording a second time stamp after said pre-determined delay;

(d) determining the actual delay time;

(e) retrieving from said DNE memory an interference threshold;

(f) displaying an error message where the percentage by which the actual delay differs from the pre-determined delay exceeds said interference threshold.

3. A computer based method for testing the cognitive performance of at least one examinee, according to claim 1, wherein the computer or other electronic device has a 10% cutoff for the maximum acceptable error with which the time required to complete a standard set of operations is measured, and a test that the average timing for a set of calibration results not vary by more than a lower bound and wherein said set of results comprises 20 responses.

4. A computer based method for testing the cognitive performance of at least one examinee, according to claim 3, wherein said lower bound is 2%.

5. A computer based method for testing the cognitive performance of at least one examinee, according to claim 3, wherein the computer or other electronic device has a 10% cutoff for the maximum acceptable error with which the time required to complete a standard set of operations is measured.

6. A computer based method for testing the cognitive performance of at least one examinee, said method comprising:

providing a computer based testing system comprising:
at least one source network entity having machine readable instructions, at least one test development system, local memory, and a plurality of executable files stored in said memory; at least one data distribution system logically connected to said source network entity; at least one destination network entity (DNE) logically connected to said data distribution system, wherein said DNE has local memory;

providing a computer readable signal train comprising:
said at least one set of instructions, said at least one test development system and said plurality of executable files;

transmitting said computer signal train to said data distribution system;

embodying said computer readable signal train in a carrier wave;

distributing said carrier wave embodying said computer readable signal train to said DNE;

performing said test development system by said DNE, including displaying instructions and challenge signals to said examinee;

capturing examinee responses to said challenge signals; and causing a pause in said examinee testing every about 10 to about 20 seconds.

7. A computer based method for testing the cognitive performance of at least one examinee, according to claim 6, wherein said test development system comprises;

means for displaying general and motivational instructions to said at least one examinee;

means for gathering information from said at least one examinee;

means for calibrating said DNE;

means for data caching;

means for generating and displaying random challenge signals;

means for measuring cognitive performance;

means for providing feedback to said at least one examinee; and means for capturing examinee keystrokes.

8. A computer based method for testing the cognitive performance of at least one examinee, according to claim 6, wherein displaying a challenge signal comprises the steps of:

(a) selecting a random challenge signal;

(b) softshifting said challenge signal;

(c) storing said challenge signal in DNE memory;

(d) displaying said softshifted signal to said examinee; and (e) storing time of display of said softshifted signal.

9. A computer based method for testing the cognitive performance of at least one examinee, according to claim 6, wherein performing a keystroke capture routine comprises the steps of:

(a) capturing at least a first keystroke;

(b) determining whether said first keystroke is a command and executing said command;

(c) determining whether the elapsed time between said signal-display and the time of said first keystroke exceeds a pre-determined limit; and (d) determining whether said keystroke is a response;

(e) determining response-type of said response as correct or incorrect;

(f) determining time of said response;

(e) storing said response, said response-type and time of said response in DNE memory.

10. A computer based method for testing the cognitive performance of at least one examinee, according to claim 6, wherein said summary information comprises information related to examinee's cognitive performance, and said information retrieved from DNE memory.

11. A computer based method for testing the cognitive performance of at least one examinee, according to claim 6, wherein a general and motivational instructions include session administration instructions, examinee finger placement instructions, and examinee alternative finger placement instructions.

12. A computer based method for testing the cognitive performance of at least one examinee, according to claim 6 wherein a motivational instructions include dietary instructions.

13. A computer based method for tearing the cognitive performance of at least one examinee, according to claim 6, wherein calibration of said DNE is performed during the delay prior to presentation of each said challenge signal.

14. A computer based method for testing the cognitive performance of at least one examinee, according to claim 6, wherein the computer or other electronic device measures the accuracy with which the passage of time is measured.

15. A computer based method for testing the cognitive performance of at least one examinee, according to claim 6, wherein users are asked to maintain an error rate above a minimum AND below a maximum and thereby to control the response speed/accuracy tradeoff more precisely than if either limit were omitted.

16. A computer based method for testing the cognitive performance of at least one examinee, according to claim 6, wherein the computer or other electronic device automatically calculates within-series and between-series averages, split-half reliabilities, standard deviations and error rates after each series of responses and five times during each measurement session, to help keep variation within acceptable limits.

17. A computer based method for testing the cognitive performance of at least one examinee, according to claim 6, wherein the computer or other electronic device provides statistical feedback during and after each series of responses and a plurality of times during each measurement session.

18. A computer based method for testing the cognitive performance of at least one examinee, according to claim 6, wherein the computer or other electronic device generates automatic interruptions, within each series of 3 to 10 responses, that stop data collection and warn the user immediately if their response error rate is too high or too low or if computer measurement accuracy is not within acceptable limits.

19. A computer based method for testing the cognitive performance of at least one examinee, according to claim 6, wherein the computer or other electronic device automatically compares previously-determined performance with present performance, several times during each measurement session, to allow individuals to equal or improve upon previous response speeds while keeping error rates approximately constant.

20. A computer based method for testing the cognitive performance of at least one examinee, according to claim 6, wherein the computer or other electronic device automatically graphs current results together with previously-obtained results several times during each measurement session.

21. A computer based method for testing the cognitive performance of at least one examinee, according to claim 6, wherein the computer or other electronic device automatically computes statistical confidence limits for changes in response time between most recent and previous measurement sessions, and displays the results of confidence calculations several times during each measurement session.

22. A computer based method for testing the cognitive performance of at least one examinee, according to claim 6, wherein the computer or other electronic device automatically displays warnings concerning driving safety and possible adverse drug events based on a comparison between present and previous results.

23. A computer based method for testing the cognitive performance of at least one examinee, according to claim 6, wherein the computer or other electronic device reduces the probability of repeated signals without preventing them entirely.

24. A computer based method for testing the cognitive performance of at least one examinee, according to claim 6, wherein the computer or other electronic device reduces the probability of obvious signal patterns without preventing them entirely.

25. A computer based method for testing the cognitive performance of at least one examinee, according to claim 6, wherein the computer or other electronic device reduces the probability of any signal pattern of a set of possible signal patterns that is chosen more frequently than other signal patterns without ever preventing the selection of any signal pattern entirely.

26. A computer based method for testing the cognitive performance of at least one examinee, according to claim 6, wherein the computer or other electronic device reduces the probability that a short, intermediate or long delay is selected before signal presentation without ever entirely preventing the selection of a short, intermediate or long delay.

27. A computer based method for testing the cognitive performance of at least one examinee, according to claim 6, wherein the computer or other electronic device examines the statistical properties of baseline data and notifies users when their baseline results are sufficient for detection of future 1%, 3% and 6% changes in response time and displays expected levels of confidence if each amount of change occurs subsequently.

28. A computer based method for testing the cognitive performance of at least one examinee; according to claim 6, wherein the computer or other electronic device provides previous and current data in a format that can be imported in databases like Excel.

29. A computer based method for testing the cognitive performance of at least one examinee, according to claim 6, wherein the computer or other electronic device automatically compares the latest several series results with the previous several series and notifies users of any change larger than a predetermined cutoff.

30. A computer based method for testing the cognitive performance of at least one examinee, according to claim 6, wherein the computer or other electronic device includes only the following two tests: choice response time (during which users choose the correct response and execute it as rapidly as possible) and list recall (during which users recall a list of numbers or words).

31. A computer based method for testing the cognitive performance of at least one examinee, according to claim 6, wherein the computer or other electronic device includes only the following three tests: choice response time, number list recall and word list recall.

32. A computer based method for testing the cognitive performance of at least one examinee, according to claim 6, wherein the computer or other electronic device includes a word list recall test during which words are presented in pairs to facilitate formation of semantic associations between the words within each pair.

33. A computer based method for testing the cognitive performance of at least one examinee, according to claim 6, wherein the computer or other electronic device operates over the Internet and provides a graph of data acquired during previous measurement sessions.

34. A computer based method for testing the cognitive performance of at least one examinee, according to claim 6, wherein the computer or other electronic device saves individual response times along with computer calibration results obtained just prior to each response.

35. A computer based method for testing the cognitive performance of at least one examinee, according to claim 6, wherein the computer or other electronic device using a keyboard for capturing responses has a version that allows any key to be pressed, for people who cannot press a particular key.

36. A computer based method for testing the cognitive performance of at least one examine; according to claim 6, wherein the computer or other electronic device automatically removes high and low response times and computes series averages several times within each measurement system, so that feedback to the user and within-session and between-session statistical evaluation are more accurate because "outlier" results have been removed.

37. A computer based method for testing the cognitive performance of at least one examinee, according to claim 6, wherein the computer or other electronic device automatically computes and presents to the user split half averages.

38. A computer based method for testing the cognitive performance of at least one examine; according to claim 6, wherein the computer or other electronic device automatically computes and presents to the user split half averages several times during each measurement session.

39. A computer based method for testing the cognitive performance of at least one examinee, according to claim 6, wherein the computer or other electronic device stores performance results in conjunction with a code name and/or password, for storage and retrieval with the code name and/or password.

40. A computer based method for testing the cognitive performance of at least one examinee, according to claim 6, wherein the computer or other electronic device stores performance results together with time-date information and measurement-accuracy-calibration data, for storage and retrieval with optionally a code name and optionally a password.

41. A computer based method for testing the cognitive performance of at least one examinee, according to claim 6, wherein the computer or other electronic device stores performance results and corresponding measurement-accuracy calibration data.

42. A computer based method for testing the cognitive performance of at least one examine; according to claim 6, wherein the computer or other electronic device stores performance results and corresponding health and health factor data.

43. A computer based method for testing the cognitive performance of at least one examinee, according to claim 6, wherein the computer or other electronic device stores performance results and corresponding food consumption data.

44. A computer based method for testing the cognitive performance of at least one examinee, according to claim 6, wherein the computer or other electronic device stores performance results and corresponding medicine consumption data.

45. A computer based method for testing the cognitive performance of at least one examinee, according to claim 6, wherein the computer or other electronic device stores performance results and corresponding health supplement consumption data.

46. A computer based method for testing the cognitive performance of at least one examinee, according to claim 6, wherein the computer or other electronic device stores performance results for a series of responses, together with corresponding heart rate data.

47. A computer based method for testing the cognitive performance of at least one examinee, according to claim 6, wherein the computer or other electronic device stores performance results for a series of responses, together with corresponding body temperature data.

48. A computer based method for testing the cognitive performance of at least one examinee, according to claim 6, wherein the computer or other electronic device stores information as a javascript cookie without transmitting said information over the Internet, wherein said information is selected from the group consisting of performance results, time-date information, measurement-accuracy-calibration data, health data, code names, and passwords.

49. A computer based method for testing the cognitive performance of at least one examinee, according to claim 6, wherein the computer or other electronic device automatically reports that the cookie storage is being reached and requests that a backup copy of stored results and associated information be made before the cookie is erased.

50. A computer based method for testing the cognitive performance of at least one examinee, according to claim 6, wherein the computer or other electronic device has an option to begin to display signals and capture responses automatically after power is turned on, thereby allowing people to use the measurement system even if they cannot read or follow program start-up instructions.

51. A computer based method for testing the cognitive performance of at least one examines, according to claim 6, wherein the computer or other electronic device has two different sets of alternative keys that can be pressed in place of the number keys 1, 2, 3 and 4 (or 1 and 2, or 1, 2 and 3) that trigger correct responses so that (1) users can rest their hands on the counter without accidentally pressing other keys on the keyboard and so that (2) users with very large hands and fingers can comfortably place their fingers on correct response keys without squeezing their fingers together and impairing their performance as a result.

52. A computer based method for testing the cognitive performance of at least one examinee, according to claim 6, wherein the computer or other electronic device allows people to choose between versions that require no choice or a choice between two signals or a choice between three signals or a choice between four signals, so that their response rates for each mode can readily be evaluated and compared.

53. A computer based method for testing the cognitive performance of at least one examinee, according to claim 6, wherein the computer or other electronic device allows users to choose between fixed and variable delays before each signal is presented.

54. A computer based method for testing the cognitive performance of at least one examinee, according to claim 6, wherein the computer or other electronic device allows users to set the fixed delay according to their preferences.

55. A computer based method for testing the cognitive performance of at least one examinee, according to claim 6, wherein the computer or other electronic device employs more than four different signal display areas to map locations within retinal or cortical visual fields or connecting nerve pathways where signal processing is slower or less accurate than elsewhere.

56. A computer based method for testing the cognitive performance of at least one examinee, according to claim 6, wherein the computer or other electronic device provides a warning if a maximum number of responses have been made, to prevent fatigue during any single measurement session.

57. A computer based method for testing the cognitive performance of at least one examinee, according to claim 6, wherein the computer or other electronic device administers a choice response time measurement system with a minimum delay solely to allow time for computer time measurement accuracy determination (computer "calibration") just before each response is measured.

58. A computer based method for testing the cognitive performance of at least one examinee, according to claim 6, wherein the computer or other electronic device has a function that automatically searches through previous results to determine whether the most recent are significantly higher or lower at the 95% confidence level, using a t-test to compute confidence levels for each pair of data evaluated.

59. A computer based method for testing the cognitive performance of at least one examinee, according to claim 6, wherein the computer or other electronic device has e-mail address storage and automatic retrieval so that reports of all previous results can be e-mailed to a physician, pharmacist or other health advisor, or to the user or anyone else, with a single click.

60. A computer based method for testing the cognitive performance of at least one examinee, according to claim 6, wherein the computer or other electronic device has a code name AND password system that allows different users to recall only their previous data.

61. A computer based method for testing the cognitive performance of at least one examinee, according to claim 6, wherein the computer or other electronic device has data cache management functions that allow raw data to be viewed, copied and erased directly from the measurement page.

62. A computer based method for testing the cognitive performance of at least one examinee, according to claim 6, wherein the computer or other electronic device has a data cache warning when stored data is about to exceed maximum permitted size.

63. A computer based method for testing the cognitive performance of at least one examinee, according to claim 6, wherein the computer or other electronic device has several different means for data storage, in case one or more are temporarily unavailable.

64. A computer based method for testing the cognitive performance of at least one examines, according to claim 6, wherein the computer or other electronic device allows users to control the number of signals in each series or the length of the delay before each signal, or to shift with one or two clicks between the following modes of measurement: no choice, 2-choice, 3-choice, number signals or sound signals, continuous signal display or display one signal at a time, automatic graphing or no graph after each set of 20 responses.

65. A computer based method for testing the cognitive performance of at least one examinee, according to claim 6, wherein the computer or other electronic device has a health rating entry or entries and sharpness/alertness rating entry and food/supplement medicine entry box that allows the relationship between self-perceived sharpness and health and response time to be tracked during each measurement session.

66. A computer based method for testing the cognitive performance of at least one examinee, according to claim 6, wherein the computer or other electronic device has heart rate and body temperature timing functions that allow heart rate and temperature measurements to be timed, so that the relationship between these key indicators of physiologic status and response time and memory can be monitored.

67. A computer based method for testing the cognitive performance of at least one examinee, according to claim 6, wherein the computer or other electronic device automatically backs up cached data at the start of each measurement session.

68. A computer based method for testing the cognitive performance of at least one examinee, according to claim 6, wherein the computer or other electronic device assigns a score equal to the number of digits or words correctly recalled three times in succession.

69. A computer based method for testing the cognitive performance of at least one examinee, according to claim 6, wherein the computer or other electronic device assigns a score equal to the number of digits or words correctly recalled four times in succession.

70. A computer based method for testing the cognitive performance of at least one examinee, according to claim 6, wherein the computer or other electronic device includes just a choice reaction time test, number recall test and word list recall test.

71. A computer based method for testing the cognitive performance of at least one examinee, according to claim 6, wherein the computer or other electronic device includes rest periods of from about 7 to about 15 seconds during which results of a series of responses are displayed.

72. A computer based method for testing the cognitive performance of at least one examinee, according to claim 6, wherein the computer or other electronic device includes a display of the average response time for the current series of responses that is updated after every keystroke.

73. A computer based method for testing the cognitive performance of at least one examinee, according to claim 6, wherein the computer or other electronic device includes software for recall of number or word or other lists.

74. A computer based method for testing the cognitive performance of at least one examinee, according to claim 6, wherein the computer or other electronic device includes within one displayed page options to switch between two-choice, three-choice, four-choice and no choice response time tests and thereby save download time.

75. A computer based method for testing the cognitive performance of at least one examinee, according to claim 6, wherein the computer or other electronic device includes within one displayed page options to switch between word list recall and fill in the missing word in each pair memory and thereby save download time.

76. A computer based method for testing the cognitive performance of at least one examinee, according to claim 6, wherein the computer or other electronic device presents only two tests—a response speed test and a memory or recall test—where both tests involve time measurements on computers or devices that are checked for time-measurement errors (i.e., calibrated) using the seine calibration algorithm.

77. A computer based method for testing the cognitive performance of at least one examines, according to claim 6, wherein the computer or other electronic device presents just two tests—a response speed test and a memory or recall test—where users are instructed to maintain error rates between minimum and maximum levels, and are also instructed to measure their recall skill by obtaining two or more correct responses in a row at each level of difficulty.

78. A computer based method for testing the cognitive performance of at least one examinee, according to claim 6, wherein the computer or other electronic device presents just two tests—a response speed test and a memory or recall test—where users are instructed to maintain error rates between minimum and maximum levels, and are also instructed to measure their recall skill by obtaining three or more correct responses in a row at each level of difficulty.

79. A computer based method for testing the cognitive performance of at least one examinee, said method comprising:
providing a computer based testing system comprising:
at least one source network entity having machine readable instructions, at least one test development system, local memory, and a plurality of executable files stored in said memory; at least one data distribution system logically connected to said source network entity; at least one destination network entity (DNE) logically connected to said data distribution system, wherein said DNE has local memory;
providing a computer readable signal train comprising:
said at least one set of instructions, said at least one test development system and said plurality of executable files;
transmitting said computer signal train to said data distribution system;
embodying said computer readable signal train in a carrier wave;
distributing said carrier wave embodying said computer readable signal train to said DNE;
performing said test development system by said DNE, including displaying instructions and challenge signals to said examinee;
capturing examinee responses to said challenge signals; and
calibrating said DNE by:
recording a first time stamp;
pausing for a pre-determined delay time;
recording a second time stamp after said pre-determined delay;
determining the actual delay time;
retrieving from said DNE memory an interference threshold;
displaying an error message where the percentage by which the actual delay differs from said pre-determined delay exceeds said interference threshold.

80. A computer based method for testing the cognitive performance of at least one examinee, said method comprising:
providing a computer based testing system comprising:
at least one source network entity having machine readable instructions, at least one test development system, local memory, and a plurality of executable flies stored in said memory; at least one data distribution system logically connected to said source network entity; at least one destination network entity (DNE) logically connected to said data distribution system, wherein said DNE has local memory;
providing a computer readable signal train comprising:
said at least one set of instructions, said at least one test development system and said plurality of executable files;

transmitting said computer signal train to said data distribution system;

embodying said computer readable signal train in a carrier wave;

distributing said carrier wave embodying said computer readable signal train to said DNE;

performing said test development system by said DNE, including displaying instructions and challenge signals to said examinee;

capturing examinee responses to said challenge signals; and displaying a challenge signal by:
selecting a random challenge signal;
softshifting said challenge signal;
storing said challenge signal in DNE memory;
displaying said softshifted signal to said examinee; and
storing time of display of said signal.

81. A computer based method for testing the cognitive performance of at least one examinee, said method comprising:

providing a computer based testing system comprising:
at least one source network entity having machine readable instructions, at least one test development system, local memory, and a plurality of executable files stored in said memory; at least one data distribution system logically connected to said source network entity; at least one destination network entity (DNE) logically connected to said data distribution system, wherein said DINE has local memory;

providing a computer readable signal train comprising:
said at least one set of instructions, said at least one test development system and said plurality of executable files;

transmitting said computer signal train to said data distribution system;

embodying said computer readable signal train in a carrier wave;

distributing said carrier wave embodying said computer readable signal train to said DNE;

performing said test development system by said DNE, including displaying instructions and challenge signals to said examinee;

capturing examinee responses to said challenge signals; and interrupting examinee testing with rest periods of from about 7 to 15 seconds during which results of a series of responses are displayed.

82. A computer based method for testing the cognitive performance of at least one examinee, according to claim 81, wherein performing said test development system comprises the steps of:

(a) displaying general and motivational instructions to said examinee;

(b) obtaining information relating to examinee health history and caching said information in DNE memory;

(f) calibrating said destination network entity;

(g) generating and displaying at least one challenge signal;

(h) capturing examinee keystrokes using said keystroke capture means;

(h) measuring examinee cognitive performance using said measurement means;

wherein said measurement is bounded by pre-determined error limits;

(i) providing performance feedback to said examinee;

(j) providing motivational feedback to said examinee; and (k) providing summary information to said examinee.

83. A computer based method for testing the cognitive performance of at least one examinee, according to claim 81, wherein the computer or other electronic device calibrates itself again and again, before each and every response keystroke, to detect even transient fluctuations in measurement accuracy during testing.

84. A computer based method for testing the cognitive performance of at least one examinee, according to claim 81, wherein the computer or other electronic device automatically re-calculates and continuously displays running avenges and also error rates or error totals after each response within each series of responses.

85. A computer based method for testing the cognitive performance of at least one examinee, according to claim 81, wherein the computer or other electronic device reduces the probability of memorable patterns without preventing them entirely.

86. A computer based method for testing the cognitive performance of at least one examinee, according to claim 81, wherein the computer or other electronic device reduces the probability that any signal of a set of possible signals is chosen more frequently than other signals without ever preventing the selection of any signal entirely.

87. A computer based method for testing the cognitive performance of at least one examinee, according to claim 81, wherein the computer or other electronic device automatically compares the latest single series of results with the previous series and notifies users of any change larger than a predetermined cutoff.

88. A computer based method for testing the cognitive performance of at least one examinee, according to claim 81, wherein the computer or other electronic device provides breaks every 10 seconds to reduce the effects of short-term fatigue.

89. A computer based method for testing the cognitive performance of at least one examinee, according to claim 81, wherein the computer or other electronic device stores individual performance results and corresponding health supplement consumption and medicine consumption and food consumption and health data.

90. A computer based method for testing the cognitive performance of at least one examinee, according to claim 81, wherein the computer or other electronic device stores performance results for a series of responses, together with corresponding heart rate and body temperature data.

91. A computer based method for testing the cognitive performance of at least one examinee, according to claim 81 wherein the computer or other electronic device stores performance results for a series of responses, together with corresponding heart rate, body temperature, health supplement consumption, medicine consumption, food consumption and health data.

92. A computer based method for testing the cognitive performance of at least one examinee, according to claim 81, wherein the computer or other electronic device has a combined automatic start up and "no choice" mode that allows any key to be pressed, thereby allowing people to use the measurement system even if they cannot reliably read or distinguish characters or symbols or press an individual keyboard key.

93. A computer based method for testing the cognitive performance of at least one examinee, according to claim 81, wherein the computer or other electronic device automatically warns users that they are significantly slower than their previous running avenge and should be extra cautious when driving and/or consult a physician or pharmacist to determine if their slow-down should be remedied in any way.

94. A computer based method for testing the cognitive performance of at least one examinee, according to claim 81, wherein the computer or other electronic device includes three alternate finger positions to allow more comfortable use of keyboards even if fingers are too wide to remain directly over adjacent keys or if fingers are most comfortably placed over adjacent keys while the base of the hand is resting on the keyboard support surface.

95. A computer based method for testing the cognitive performance of at least one examinee, according to claim 81, wherein the computer or other electronic device includes regular collection of health factor, time-date and dose information in connection with performance measurement and then automatic calculation of a benefit-decrement value for each health factor.

* * * * *